United States Patent
Zhou

(10) Patent No.: US 12,527,654 B2
(45) Date of Patent: Jan. 20, 2026

(54) INTERDENTAL BRUSH

(71) Applicant: Xing Zhou, Guangzhou (CN)

(72) Inventor: Xing Zhou, Guangzhou (CN)

( * ) Notice: Subject to any disclaimer, the term of this patent is extended or adjusted under 35 U.S.C. 154(b) by 0 days.

(21) Appl. No.: 17/722,190

(22) Filed: Apr. 15, 2022

(65) Prior Publication Data

US 2022/0241058 A1  Aug. 4, 2022

Related U.S. Application Data

(63) Continuation of application No. 16/841,391, filed on Apr. 6, 2020, now Pat. No. 11,344,393, which is a
(Continued)

(30) Foreign Application Priority Data

Mar. 12, 2014 (CN) .......................... 201410091268.0
Mar. 12, 2014 (CN) .......................... 201420112850.6
(Continued)

(51) Int. Cl.
*A61C 15/00* (2006.01)
*A46B 9/04* (2006.01)
(Continued)

(52) U.S. Cl.
CPC ................ *A61C 17/22* (2013.01); *A46B 9/04* (2013.01); *A46B 11/0072* (2013.01);
(Continued)

(58) Field of Classification Search
CPC ............ A46B 15/0034; A46B 15/0036; A46B 15/0095; A46B 15/0069; A46B 9/04; A46B 2200/108; A61C 15/00; A61C 15/02

See application file for complete search history.

(56) References Cited

U.S. PATENT DOCUMENTS 1,796,367 A  3/1931  Grove
2,765,799 A  10/1956  Ritter
(Continued)

FOREIGN PATENT DOCUMENTS

CN  1150750 A  5/1997
CN  1480108 A  3/2004
(Continued)

OTHER PUBLICATIONS

Zhou, Xing, International Search Report, PCT/CN2015/073927, Jun. 1, 2015, 2 pgs.
(Continued)

*Primary Examiner* — Heidi M Eide
(74) *Attorney, Agent, or Firm* — Morgan, Lewis & Bockius LLP

(57) ABSTRACT

A device comprises an interdental brush, a delivery component, and a lighting system. The interdental brush is disposed at a first end of the device and includes a working part and a connector. The delivery component includes a guide head and a sliding mechanism that is mechanically connected to the guide head. The guide head includes a bended tube within which the working part of the interdental brush is positioned. An outlet of the bended tube is disposed at an end of the guide head. The sliding mechanism includes a sliding block and an interdental brush connecting mechanism that mechanically connects the interdental brush to the sliding block. The lighting system includes a switch and a light source. The light source is disposed at the first end of the device and is electrically coupled to the switch through the guide head that houses the interdental brush.

20 Claims, 12 Drawing Sheets

Related U.S. Application Data continuation of application No. 15/034,157, filed as application No. PCT/CN2015/073927 on Mar. 10, 2015, now Pat. No. 10,646,314.

(30) Foreign Application Priority Data

Mar. 21, 2014 (CN) .................. 201410108525.7
Mar. 21, 2014 (CN) .................. 201420132867.8

(51) Int. Cl.
| | |
|---|---|
| A46B 11/00 | (2006.01) |
| A46B 15/00 | (2006.01) |
| A61C 15/02 | (2006.01) |
| A61C 17/22 | (2006.01) |

(52) U.S. Cl.
CPC ...... *A46B 15/0036* (2013.01); *A46B 15/0069* (2013.01); *A46B 15/0077* (2013.01); *A46B 15/0095* (2013.01); *A61C 15/00* (2013.01); *A61C 15/02* (2013.01); *A46B 2200/108* (2013.01)

(56) References Cited

U.S. PATENT DOCUMENTS

| | | | | |
|---|---|---|---|---|
| 4,033,007 | A | * | 7/1977 | Hadary .............. A46B 15/0095 15/176.4 |
| 4,520,833 | A | | 6/1985 | Hadary |
| 4,706,322 | A | | 11/1987 | Nicolas |
| 5,623,746 | A | | 4/1997 | Ichiro |
| 6,102,700 | A | | 8/2000 | Haczek et al. |
| 6,247,477 | B1 | | 6/2001 | Wagner |
| 6,331,111 | B1 | | 12/2001 | Cao |
| 6,468,076 | B2 | | 10/2002 | Kawamura |
| 7,156,107 | B2 | | 1/2007 | Hsu |
| 8,011,057 | B2 | | 9/2011 | Nejat |
| 2001/0012605 | A1 | * | 8/2001 | Kawamura ........ A61C 17/0202 433/29 |
| 2001/0054211 | A1 | | 12/2001 | Cabedo-Deslierres et al. |
| 2003/0215765 | A1 | | 11/2003 | Liu |
| 2004/0019990 | A1 | | 2/2004 | Farell |
| 2006/0183071 | A1 | * | 8/2006 | Hsuch .................. A61N 5/0603 433/29 |
| 2008/0115799 | A1 | | 5/2008 | Weiss |
| 2008/0254408 | A1 | * | 10/2008 | Coates .................. A61C 15/00 433/105 |
| 2009/0029323 | A1 | * | 1/2009 | Nejat .................. A46B 13/023 15/22.1 |
| 2009/0056043 | A1 | | 3/2009 | Sugimoto |
| 2009/0148808 | A1 | * | 6/2009 | Alexander .......... A61N 5/0603 433/29 |
| 2011/0041271 | A1 | | 2/2011 | Huang |
| 2011/0314618 | A1 | * | 12/2011 | Binner ................ A46B 15/0034 433/29 |
| 2013/0061412 | A1 | * | 3/2013 | Vashi ...................... A61C 17/22 15/23 |
| 2015/0257636 | A1 | * | 9/2015 | Kohler ................ A46B 15/0036 433/29 |
| 2015/0342706 | A1 | * | 12/2015 | Leue .................. B05C 17/0116 222/340 |
| 2016/0242652 | A1 | * | 8/2016 | Van Putten ........ A46B 15/0034 |

FOREIGN PATENT DOCUMENTS

| | | | |
|---|---|---|---|
| CN | 201170834 | Y | 12/2008 |
| CN | 201208021 | Y | 3/2009 |
| CN | 201223465 | Y | 4/2009 |
| CN | 203801948 | U | 9/2014 |
| CN | 203885648 | U | 10/2014 |
| DE | 29911636 | U1 | 9/1999 |
| DE | 202006004214 | U1 | 5/2006 |
| DE | 102008034423 | A1 | 1/2010 |
| EP | 2022444 | A1 | 2/2009 |
| JP | S5663419 | U | 5/1981 |
| JP | H0615534 | U | 3/1994 |
| JP | 2002045379 | A | 2/2002 |
| JP | 3098889 | U | 3/2004 |
| JP | 2004313446 | A | 11/2004 |
| KR | 200437911 | Y1 | 1/2008 |
| KR | 20090129844 | A | * 12/2009 | ............. A46B 17/02 |
| KR | 20130006414 | U | * 11/2013 | ............ A46B 5/0016 |
| WO | WO94/17690 | A1 | 8/1994 |
| WO | WO2006/125204 | A2 | 11/2006 |
| WO | WO-2010118563 | A1 | * 10/2010 | ........... A61B 5/0088 |
| WO | WO2010/144334 | A2 | 12/2010 |
| WO | WO-2013072308 | A2 | * 5/2013 | ............ A46B 13/001 |

OTHER PUBLICATIONS

Zhou, Xing, Written Opinion, PCT/CN2015/073927, Jun. 1, 2015, 19 pgs.
Zhou, Xing, International Preliminary Report on Patentability, PCT/CN2015/073927, Sep. 13, 2016, 20 pgs.
Zhou, Xing, Communication Pursuant to Rules 161(2) and 162. EP15761870.3, Nov. 18, 2016, pgs.
Zhou, Xing, Examination Report No. 1, AU2015230466, Feb. 20, 2019, 3 pgs.
Zhou, Xing, Extended European Search Report. EP15761870.3, Mar. 16, 2018, 14 pgs.
Zhou, Xing, Communication Pursuant to Article 94(3), EP15761870.3, Feb. 11, 2020, 5 pgs.
Zhou, Xing, Office Action, IN201627031981, Aug. 21, 2019, 6 pgs.
Zhou, Xing, Invitation to Respond to Written Opinion, SG11201607556V, Dec. 19, 2017, 12 pgs.
Zhou, Xing, Invitation to Respond to Written Opinion, SG11201607556V, Mar. 12, 2019, 7 pgs.
Zhou, Xing, Japanese Office Action, 2016-574323, Aug. 21, 2018, 8 pgs.
Zhou, Xing, Patent Certificate, KR2016-7028232, Apr. 30, 2019, 2 pgs.
Zhou, Xing, Decision to Grant, 2016-574323, Mar. 1, 2019, 3 pgs.
Zhou, Xing, First Office Action, CN201410091268.0, Apr. 18, 2016, 16 pgs.
Zhou, Xing, Second Office Action, CN201410091268.0, Nov. 18, 2016, 18 pgs.
Zhou, Xing, First Office Action, CN201410108525.7, May 5, 2016, 13 pgs.
Zhou, Xing, Second Office Action, CN201410108525.7, Mar. 23, 2017, 15 pgs.
Zhou, Xing, Third Office Action, CN201410108525.7, Aug. 11, 2017, 15 pgs.
Zhou, Xing, Fourth Office Action, CN201410108525.7, Jan. 31, 2018, 15 pgs.
Zhou, Office Action, U.S. Appl. No. 15/034,157, Nov. 5, 2018, 22 pgs.
Zhou, Final Office Action, U.S. Appl. No. 15/034,157, May 9, 2019, 16 pgs.
Zhou, Notice of Allowance, U.S. Appl. No. 15/034,157, Jan. 24, 2020, 9 pgs.
Zhou, Non-Final Office Action, U.S. Appl. No. 16/841,391, Mar. 9, 2021, 24 pgs.
Zhou, Final Office Action, U.S. Appl. No. 16/841,391, Aug. 20, 2021, 26 pgs.
Zhou, Notice of Allowance, U.S. Appl. No. 16/841,391, Mar. 9, 2022, 8 pgs.
Zhou, Xing, International Search Report and Written Opinion, PCT/CN2015/073927, Jun. 1, 2015, 33 pgs.
Zhou, Xing, International Preliminary Report on Patentability, PCT/CN2015/073927, Sep. 13, 2016, 9 pgs.

* cited by examiner

INTERDENTAL BRUSH

This application is a continuation of U.S. patent application Ser. No. 16/841,391, filed on Apr. 6, 2020, entitled "Interdental Brush," which is a continuation of U.S. patent application Ser. No. 15/034,157, filed on May 3, 2016, entitled "Interdental Brush," now U.S. Pat. No. 10,646,314, issued on May 12, 2020, which is a U.S. National Stage application filed under 35 U.S.C. 371 of PCT Patent Application serial number PCT/CN2015/073927, filed on Mar. 10, 2015, which claims benefit to: (i) Chinese Patent Application serial number 201420112850.6, filed on Mar. 12, 2014, (ii) Chinese Patent Application serial number 201410091268.0, filed on Mar. 12, 2014, (iii) Chinese Patent Application serial number 201420132867.8, filed on Mar. 21, 2014, and (iv) Chinese Patent Application serial number 201410108525.7, filed on Mar. 21, 2014, all of which are hereby incorporated by reference in their entirety.

FIELD OF THE INVENTION

The present application relates to an oral cavity cleaning tool, and in particular, to an interdental brush used for cleaning a tooth clearance.

BACKGROUND OF THE INVENTION

Age increasing, pathology, and the like easily cause gum recession and enlarged tooth clearance, and extremely easily cause food remains. If the food remains fails to be timely cleaned, in one aspect, bad breath is generated, and in the other aspect, various dental diseases, oral cavity diseases, and especially periodontitis easily occur.

In view of this situation, currently, various interdental brushes are developed in the market for users to choose. Although products of various structures and different specifications exist in the existing market, the existing products generally have some defects. In the prior art, an interdental brush is divided into a plastic handler portion and a brush working portion, where diameter of the working portion is usually between 0.8 mm to 1.2 mm and length of the working portion is about 13 mm, and the working portion is a brush structure in which polymer fiber is attached to a metal wire; and the brush working portion is fastened at a front end of the plastic handler, and the brush working portion is exposed outside of the handler. The interdental brush needs to enter tooth clearances of different locations at different angles. However, the diameter of the working portion of the interdental brush is only about 1 mm, and the length of the working portion of the interdental brush reaches 13 mm, so force delivery is poor. It is difficult for the interdental brush of the prior art to be aligned to the tooth clearance in deep oral cavity, so by using the interdental brush of the prior art, the metal wire is bended, or the metal wire stabs gum and causes the gum bleeds, so the interdental brush is inconvenient to use.

To avoid the gum being stabbed by the metal wire, in the interdental brush of the prior art, there is also an interdental brush made of soft polymer material. Although the head of the interdental brush becomes soft, which reduces harm to the gum, strength of the interdental brush is low, so bending deformation is easily caused and it is difficult for the interdental brush to be aligned the tooth clearance and pushed into the tooth clearance; therefore, the tooth clearance is hard to be cleaned.

Generally, there are problems during use of the interdental brush of the prior art, for example, it is difficult to observe a tooth clearance and align the tooth clearance, the interdental brush easily bends and is hard to insert into the tooth clearance, which easily cause an unexpected gum injury; and when the interdental brush of the prior art is used to clean a tooth clearance between molars, especially a tooth clearance between a third molar and a second molar, or a tooth clearance between a second molar and a first molar, or a tooth clearance between a first molar and a second molar, there are the following defects: the light is dim, it is difficult to observe the tooth clearance, the interdental brush is difficult to enter the tooth clearance, and the interdental brush may easily stab the gum. In addition, when there is no external lighting, a user can perform operations only by feed; therefore, it is very easy to stab gum tissue.

SUMMARY

An objective of the present application is to provide a new type interdental brush, for which a tooth clearance is easily observed, the interdental brush can easily enter the tooth clearance, force delivery is good, the interdental brush can move back and force in the tooth clearance, the interdental brush can easily clean the tooth clearance, and will not stab gum.

One core of the technical solutions provided in the present application is: making a working part of the interdental brush automatically bend for easily aligning a tooth clearance; and reducing a distance that the working part of the interdental brush from an outlet of a delivery component to the tooth clearance, where a shorter distance indicates a good controllability of the interdental brush. The objective of the present application is implemented by:

a built-in interdental brush, where the built-in interdental brush includes an interdental brush 1 and a delivery component 2, and the interdental brush 1 may be movably built in a bended tube 21-1 of a front end of the delivery component 2, where A: the delivery component 2 includes a guide head 21, a sliding mechanism 22, and a housing 23, where the guide head 21 is disposed on the front end 2-1 of the delivery component 2, and the guide head 21 includes the bended tube 21-1, and an outlet 21-2 of the bended tube 21-1 is disposed at an end 21-3 of the guide head 21;

B: the interdental brush 1 includes a working part 11 with fiber or a protrusion 11-1 and a connector 12, where the working part 11 is disposed at a front end of the connector 12; and C: the interdental brush 1 is installed in the bended tube 21-1, the working part 11 of the interdental brush can slide in the bended tube 21-1, and the connector 12 of the interdental brush is installed on the sliding mechanism 22 of the delivery component 2; a movement of the sliding mechanism 22 can drive the working part 11 of the interdental brush slide in the bended tube 21-1; and the sliding mechanism 22 is driven to make the working part 11 of the interdental brush extend from the outlet 21-2 of the bended tube at the end of the guide head.

Further, the interdental brush 1 is of a linear type and is made of elastic material. After elastic deformation of the linear type interdental brush 1, the linear type interdental brush 1 can be installed in the bended tube 21-1, and after the working part 11 of the linear type interdental brush 1 extends from the bended tube 21-1, the working part 11 of the interdental brush can be returned or basically returned to the linear type.

The elastic material is selected from elastic polymer material or elastic metallic material. For example, the fiber or the protrusion 11-1 of the working part 11 of the interdental brush is made of elastic polymer material, and the connector 12 is made of elastic metallic material. By using an injection molding process in a metal mold, the connector 12 made of the elastic metallic material and the fiber or the protrusion 11-1 made of elastic polymer material are formed into a whole, so as to form the interdental brush 1. Therefore, the interdental brush of a composite structure not only ensure softness of the working part 11 of the interdental brush, but also keep flexible and appropriate stiffness of the whole interdental brush, and force delivery of the interdental brush is good.

The interdental brush 1 further includes a smooth guide head 11-2, and the smooth guide head 11-2 is disposed at a front end of the working part 11 of the interdental brush. Disposing the smooth guide head 11-2 at the header of the interdental brush may effectively prevent the gum from being stabbed.

The smooth guide head 11-2 is cone-shaped or bullet shaped.

The fiber or the protrusion 11-1 of the working part 11 of the interdental brush is a protrusion formed by a thread structure, or a vane-type protrusion, or a fibrous protrusion, or the like.

The sliding mechanism 22 includes an interdental brush connecting mechanism 22-1 and a sliding block 22-2, where the interdental brush connecting mechanism 22-1 is disposed on the sliding block 22-2; and the connector 12 of the interdental brush is detachably connected to the interdental brush connecting mechanism 22-1, the sliding block (22-2) can be pushed and pulled to drive the interdental brush 1 to perform a reciprocating movement in the bended tube 21-1, so as to make the working part 11 of the interdental brush extend from or withdraw to the outlet 21-2 of the bended tube at the end of the guide head. The interdental brush 1 is detachably installed in the bended tube 21-1 of the delivery component 2 and is connected to the sliding mechanism 22, so that the interdental brush 1 may be easily replaced.

A mode of the connection between the connector 12 of the interdental brush 1 and the interdental brush connecting mechanism 22-1 of the sliding mechanism 22 is a concave-convex-fit connection mode, or a threaded connection mode, or an interference-fit connection mode, or the like.

The sliding mechanism 22 further includes a driving spring 22-2 that can push the sliding mechanism 22 to move forward, where one end of the driving spring 22-2 is connected to the sliding mechanism 22 and the other end is connected to the housing 23. The driving spring 22-2 can apply a moderate size and uniform push force to the interdental brush, so as to prevent the gum from being stabbed.

Generally, the push force applied by the driving spring 22-2 to the interdental brush 1 is smaller than 100 g. The push force applied by the driving spring 22-2 to the interdental brush 1 should not harm the gum.

A built-in interdental brush of the present application uses a structure in which the interdental brush 1 is built in the bended tube 21-1 of the guide head 21 of the delivery component 2, after the working part 11 of the interdental brush 1 made of elastic material is aligned to a tooth clearance, the sliding mechanism 22 on the delivery component 2 is pushed to drive the working part 11 of the interdental brush 1 automatically bend along curvature of the bended tube 21-1, the working part 11 of the interdental brush 1 is aligned to the tooth clearance and pushed into the tooth clearance, and by pushing and pulling the sliding block 22-2 on the sliding mechanism 22 of the delivery component 2, the working part 11 of the interdental brush moves back and forth in the tooth clearance to clean the tooth clearance. Because the delivery component 2 has good stiffness, after the outlet 21-2 of the bended tube of the guide head of the delivery component is aligned to the tooth clearance, the pushed out working part of the interdental brush 1 directly enters the tooth clearance, and because the outlet 21-2 of the bended tube of the guide head of the delivery component is almost close to the tooth clearance, the working part 11 of the interdental brush is hard to be bended, force delivery of the interdental brush 1 is significantly improved and controllability of the interdental brush 1 is improved, thereby avoiding that, when the interdental brush of the prior art is used to clean a tooth clearance between molars, the interdental brush easily bends and hurts the gum. Especially after a lighting system 24 and an observation system 25 are added to the built-in interdental brush of the prior art, a lighting condition in an oral cavity is improved, the clearance between molars may be clearly observed, and a process that the interdental brush enters the tooth clearance is directly observed, which is convenient for cleaning and avoids an accidental injury to the gum.

The other core of the technical solutions provided in the present application is: providing a corresponding lighting system for the interdental brush for a user to easily align to a tooth clearance. The objective of the present application is implemented by:

A lighting-enabled interdental brush, where the lighting-enabled interdental brush includes an interdental brush 1 and a delivery component 2, where A: the interdental brush 1 includes a working part 11 with fiber or a protrusion 11-1 and a connector 12, where the working part 11 is disposed at a front end of the connector 12;

B: the delivery component 2 includes a guide head 21, a housing 23, and a lighting system 24, where the guide head 21 is installed at a front end of the housing 23 and the lighting system 24 is disposed at a front end of the guide head 21 or installed in the housing 23; and C: the interdental brush 1 is installed on the guide head 21 at a front end of the of the delivery component 2.

A connection mode between the interdental brush 1 and the delivery component 2 is a non-detachable connection or a detachable connection. The foregoing non-detachable connection mode may be an overall injection molding mode, or a welded connection mode, or a bonding connection mode, or the like. The foregoing detachable connection mode may be a threaded connection mode, or a concave-convex-fit connection mode, or an interference-fit connection mode, or the like.

The lighting system 24 includes a light source system 24-1, a lighting switch 24-2, an electrical system 26, and a power system 27.

The light source system 24-1 is disposed at the front end of the guide head 21 of the delivery component 2, the electrical system 26 and the power system 27 are installed in the housing 23, the lighting switch 24-2 is disposed on the housing 23, and the light source system 24-1, the power system 26, and the lighting switch 24-2 are connected together by using the electrical system 26. The light system 24 is a front-positioned light source lighting system.

The guide head 21 of the delivery component 2 is made of optical transmission material, and the optical transmission material is selected from: polystyrene, or polycarbonate, or polymethylmethacrylate, or the like. Currently, the polymethylmethacrylate, which is commonly known as acrylic material, is often used.

The light source system 24-1 is installed at a back end of the guide head 21 of the delivery component 2, and by using an optical transmission function of the guide head 21 made of the optical transmission material, lighting from the light source system 24-1 is transmitted to the front end of the guide head 21 to play a role of lighting; and the electrical system 26 and the power system 27 are installed in the housing 23, the lighting switch 24-2 is disposed on the housing 23, and the light source system 24-1, the power system 27, and the lighting switch 24-2 are connected together by using the electrical system 26. The light system 24 is a back-positioned light source lighting system. The light source system 24-1 may use an LED light source.

An observation system 25 is disposed on the guide head 21 at the front end of the delivery component 2.

The observation system 25 is an observation mirror 25-1, and the observation mirror 25-1 is fastened at the front end of the guide head 21 of the delivery component 2 or installed at the front end of the guide head 21 of the delivery component 2 at an adjustable angle.

Further, the observation mirror 25-1 is connected to the guide head 21 at an adjustable angle by means of a ball joint connection or a shaft connection.

The observation system 25 is a camera system 25-2, and the camera system 25-2 includes a camera 25-2-1, a data processing and outputting system 25-2-2, the electrical system 26, and the power system 27.

Video data output by the data processing and outputting system 25-2-2 of the camera system 25-2 can be displayed on a display 25-2-3 by means of a wired connection or a wireless connection, where the display 25-2-3 includes: a smart phone 25-2-31, or a computer 25-2-32, or a liquid crystal display 25-2-33, or a television 25-2-34.

The camera 25-2-1 is disposed on the guide head 21 at the front end of the delivery component (2).

The camera 25-2-1 is installed on the guide head 21 at an adjustable angle.

The light source system 24-1 for providing lighting is disposed surround the camera 25-2-1.

The camera 25-2-1 is connected to the guide head 21 at an adjustable angle by means of a shaft connection or a ball joint connection.

Further, a toothbrush 3 is disposed on a tail 2-3 of the delivery component 2.

A storage compartment 28 that can store the interdental brush 1, or the toothbrush 3, or a tooth paste 4 is disposed on the tail 2-3 of the delivery component 2. The storage compartment 28 may incorporate the interdental brush 1, or the toothbrush 3, or the tooth paste 4.

The lighting-enabled interdental brush of the present application uses the guide head 21 of the delivery component 2 made of optical transmission material, by using an optical transmission function of the guide head 21 of the delivery component 2, lighting emitted from the light source system 24-1 that is installed at the back end of the guide head 21 of the delivery component is transmitted to the end of the guide head 21 of the delivery component 2 to play a role of lighting, so that a lighting condition in an oral cavity is significantly improved. Especially, the observation system is further designed on the lighting-enabled interdental brush of the present application, by using the observation mirror 25-1 or the camera system 25-2 during use, a process that the interdental brush enters a tooth clearance is observed directly, which is convenient for cleaning and avoids an accidental injury to the gum.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

FIG. 1-1 is a schematic structural diagram when the interdental brush of FIG. 1 is partially pushed out from a delivery component;

FIG. 1-2 is a schematic structural diagram when the interdental brush of FIG. 1 is completely pushed out from the delivery component;

FIG. 2 is a schematic structural diagram of a built-in interdental brush including a push force according to the present application, where in this embodiment, a driving spring 22-3 is compressed by a sliding block 22-2, so that a working part 11 of an interdental brush 1 is completely withdrew into a bended tube 21-1 of a guide head of a delivery component;

FIG. 2-1 is a schematic structural diagram when the interdental brush of FIG. 2 is completely pushed out from the delivery component, where in this embodiment, the sliding block 22-2 moves forward and a push force on the driving spring 22-3 is released, so that the working part 11 of the interdental brush 1 is completely exposed outside of the guide head 21 of the delivery component;

FIG. 8-1 is a schematic assembly relationship diagram of an interdental brush installed in a bended tube of a guide head at a front end of a delivery component of a built-in interdental brush of the present application;

FIG. 8-2 is a schematic structural diagram when the interdental brush of the built-in interdental brush of the present application of FIG. 8 is completely withdrew;

FIG. 8-3 is a schematic structural diagram when the interdental brush of the built-in interdental brush of the present application of FIG. 8 is completely pushed out;

FIG. 9-1 is a schematic assembly relationship diagram of an interdental brush installed in a bended tube of a guide head at a front end of a delivery component of a built-in interdental brush of the present application;

FIG. 9-2 is a schematic structural diagram when the interdental brush and the toothbrush of the built-in interdental brush of the present application of FIG. 9 are completely withdrew;

FIG. 9-3 is a schematic structural diagram when the interdental brush of the built-in interdental brush of the present application of FIG. 9 is completely pushed out;

FIG. 10-1 is a schematic structural diagram of a built-in interdental brush of the present application in which fiber or a protrusion of a working part of an interdental brush is a vane-type protrusion;

FIG. 10-2 is a schematic structural diagram of a built-in interdental brush of the present application in which fiber or a protrusion of a working part of an interdental brush is a fibrous protrusion;

FIG. 14-1 is a schematic structural diagram of a positioning groove of the concave-convex-fit of FIG. 14;

Figure 1:
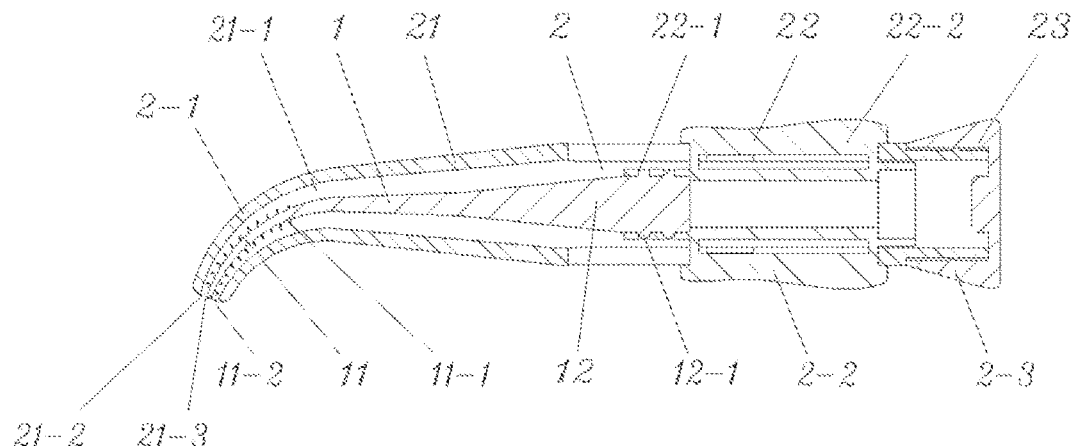
FIG. 1 is a schematic structural diagram of a built-in interdental brush according to the present application.
Figure 1:
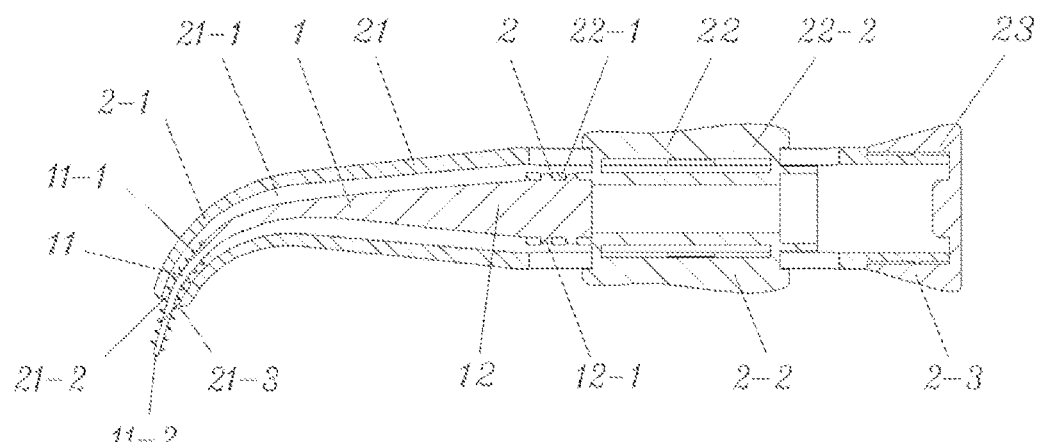

IN THE FOREGOING FIGURES 1 indicates an interdental brush, 2 indicates a delivery component, 3 indicates a toothbrush, and 4 indicates a tooth paste;

On the Interdental Brush:
11 indicates a working part of the interdental brush, 11-1 indicates fiber or a protrusion on the working part, and 11-2 indicates a cone-shaped guide head at a front end of the working part; and
12 indicates a connector of the interdental brush, 12-1 indicates a positioning convex step, and 12-2 indicates a positioning hole;

On the Delivery Component:
21 indicates a guide head, 21-1 indicates a bended tube, 21-2 indicates an outlet of the bended tube, 21-3 indicates an end of the guide head, and 21-4 indicates a positioning convex step;
22 indicates a sliding mechanism, 22-1 indicates a connecting mechanism connected to the interdental brush, 22-2 indicates a sliding block, 22-3 indicates a driving spring, and 22-1-1 indicates a positioning convex step on the interdental brush connecting mechanism;
23 indicates a housing, 23-1 indicates a top cover on the housing, 23-2 indicates a slideway along which the sliding block moves, 23-3 indicates a positioning groove, and 23-4 indicates a sealing ring;
24 indicates a lighting system, 24-1 indicates a light source system, and 24-2 indicates a lighting switch;
25 indicates an observation system, 25-1 indicates an observation mirror, 25-2 indicates a camera system, 25-2-1 indicates a camera, 25-2-2 indicates a data processing and outputting system, 25-2-3 indicates a display, 25-2-31 indicates a mobile phone, 25-2-32 indicates a computer, 25-2-33 indicates a liquid crystal display, and 25-2-34 indicates a television;
26 indicates an electrical system;
27 indicates a power system;
28 indicates a storage compartment;
29 indicates a ball joint connection or a shaft connection; and
3-1 indicates a rotation shaft.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Embodiment 1: Built-In Interdental Brush of the Present Invention

Figures 1, 2:
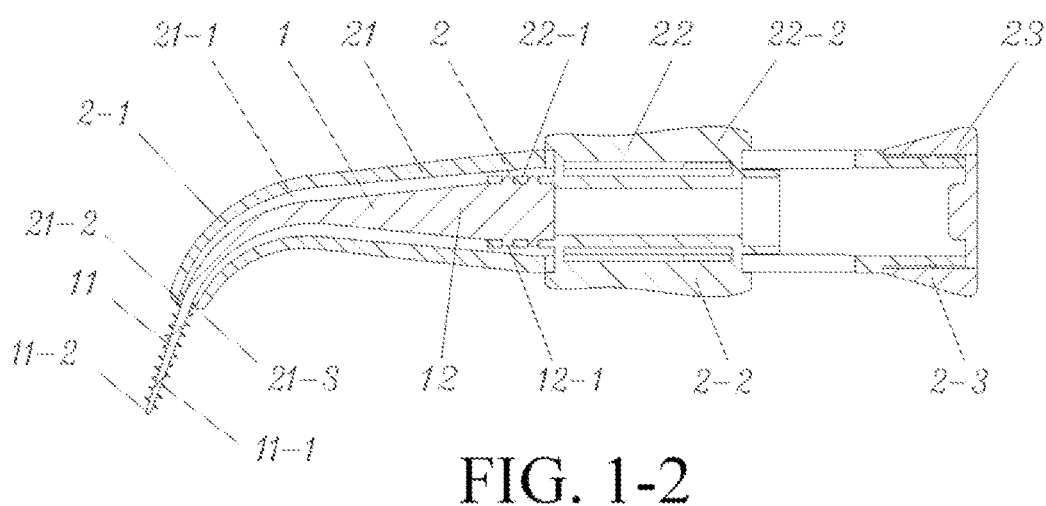
Figure 2:
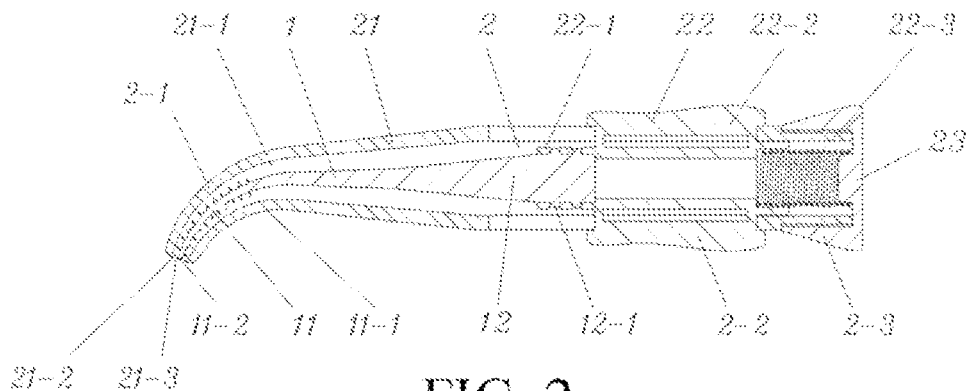
Figures 1, 2:
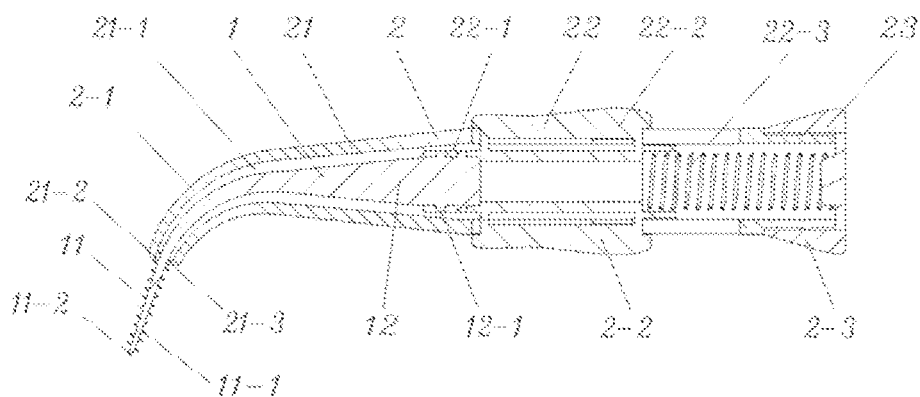

Referring FIG. 1 to FIG. 1-2, a built-in interdental brush of the present application includes an interdental brush 1 and a delivery component 2.

The interdental brush 1 includes a working part 11 with fiber or a protrusion 11-1 and a connector 12, where the working part 11 is disposed at a front end of the connector 12. The protrusion 11-1 of the working part 11 of the interdental brush 1 is of a thread structure, and a smooth cone-shaped guide head 11-2 is disposed at an end of the working part 11 of the interdental brush 1, and the cone-shaped guide head 11-2 may effectively prevent gum from being injured by the working part 11 during use. A positioning convex step 12-1 or a positioning hole 12-2 is disposed on the connector 12, for which refer to FIG. 10 to FIG. 10-2.

The interdental brush 1 is of a linear type, the protrusion 11-1 of the thread structure of the working part 11 of the interdental brush is made of elastic polymer material, and the connector 12 is made of elastic metallic material. By using an injection molding process in a metal mold, the connector 12 made of the elastic metallic material and the fiber or the protrusion 11-1 made of elastic polymer material are formed into a whole, so as to form the interdental brush 1. Therefore, the interdental brush of a composite structure not only ensure softness of the working part 11 of the interdental brush, but also keep flexible and appropriate stiffness of the whole interdental brush, and force delivery of the interdental brush is good.

The delivery component 2 includes a guide head 21, a sliding mechanism 22, and a housing 23, where the guide head 21, the sliding mechanism 22, and the housing 23 are connected into a whole.

The guide head 21 is disposed at a front end 2-1 of the delivery component 2, the guide head 21 includes a bended tube 21-1, and an outlet 21-2 of the bended tube 21-1 is disposed at an end 21-3 of the guide head 21, where the end 21-3 of the guide head is a plane or curved surface having a smooth surface.

The sliding mechanism 22 includes an interdental brush connecting mechanism 22-1 and a sliding block 22-2, where the interdental brush connecting mechanism 22-1 is disposed on the sliding block 22-2.

Figure 8:
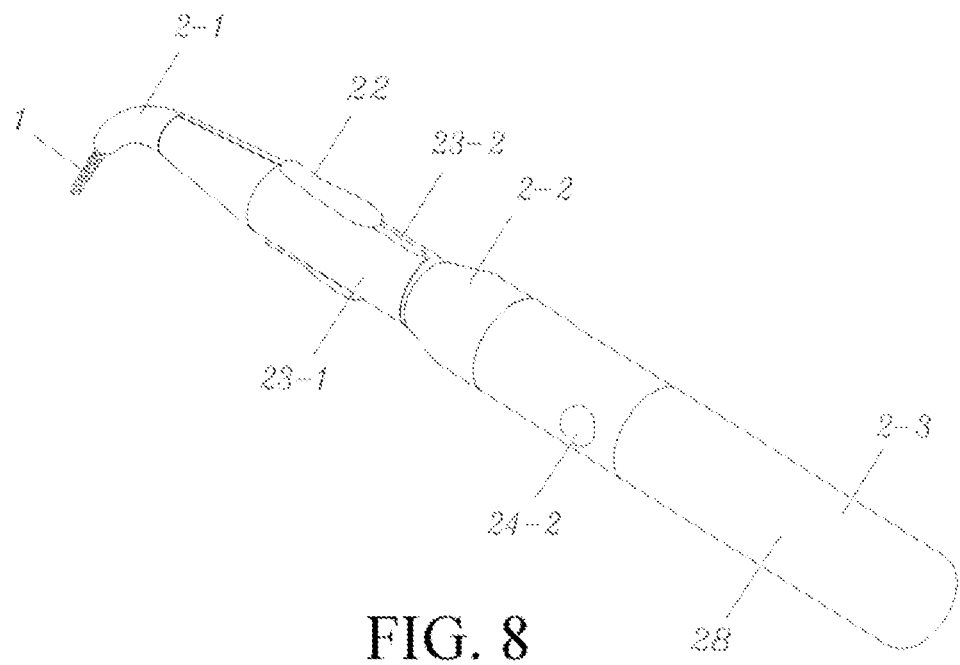
FIG. 8 is a schematic structural diagram of a built-in interdental brush including a storage compartment of the present application.
Figures 1, 8:
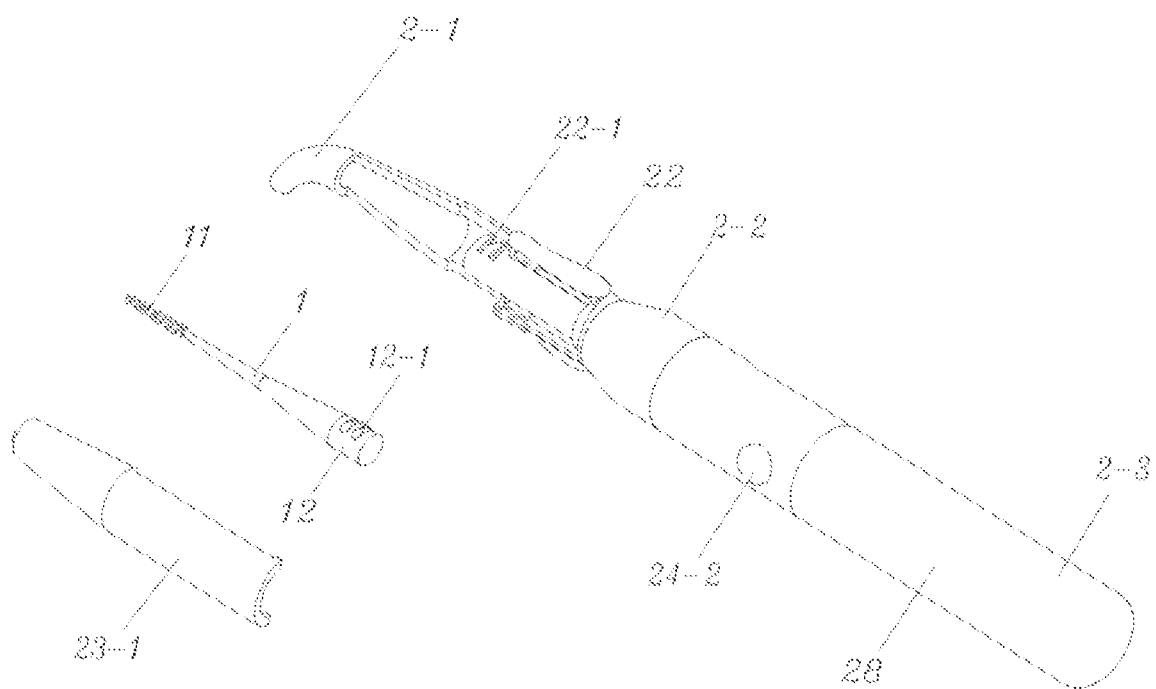
Figures 2, 8:
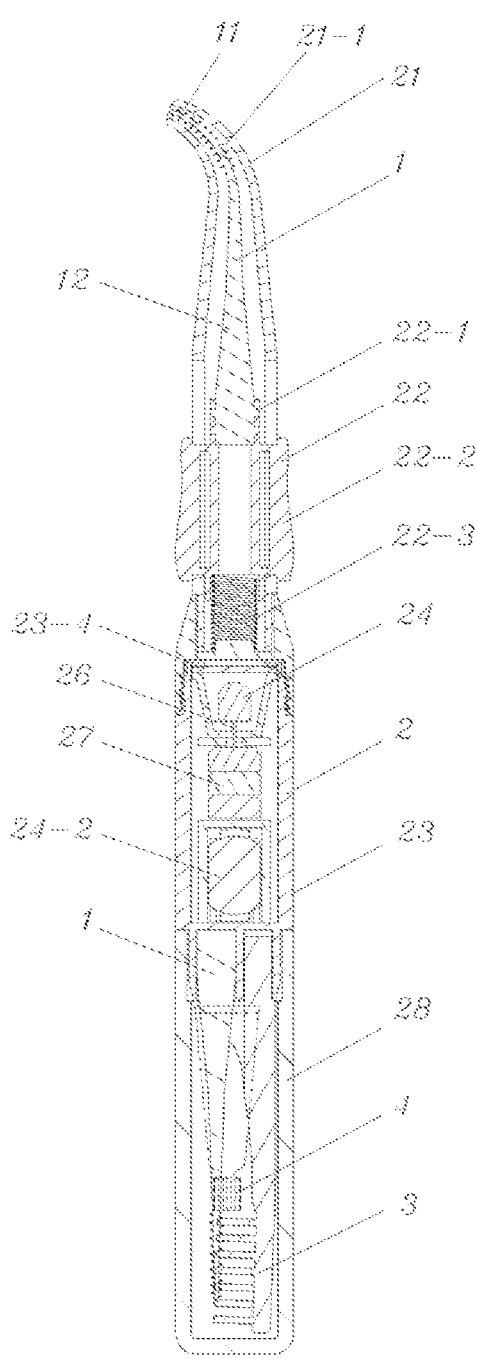
Figures 3, 8:
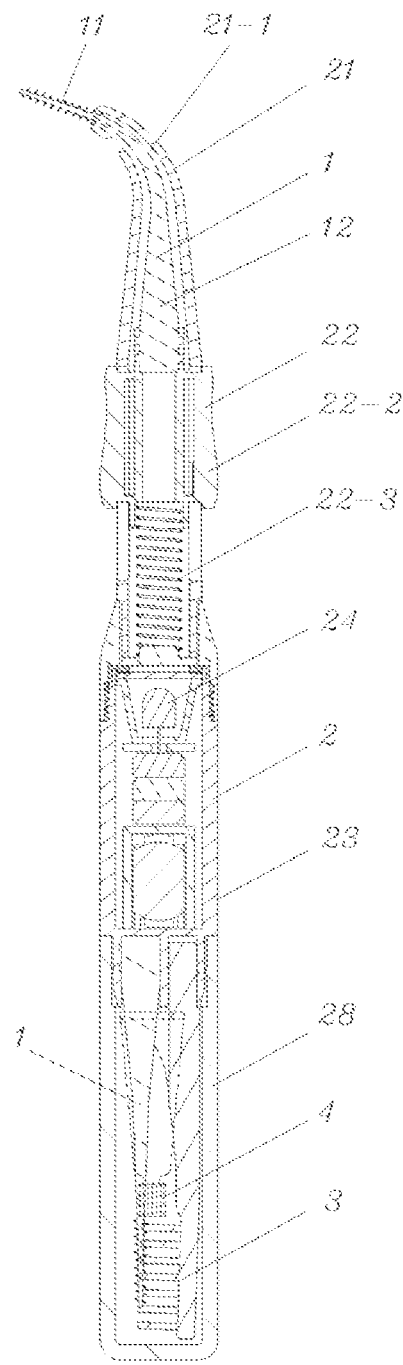

A top cover 23-1 that can be opened when the interdental brush 1 is installed and a slideway 23-2 where the sliding block 22-2 moves back and forth are disposed on the housing 23, for which refer to FIG. 8.

After elastic deformation of the linear type interdental brush 1, the linear type interdental brush 1 can be installed in the bended tube 21-1, and after the working part 11 of the linear type interdental brush 1 extends from the bended tube 21-1, the working part 11 of the interdental brush can be returned or basically returned to the linear type.

The connector 12 of the interdental brush 1 is connected to the interdental brush connecting mechanism 22-1 in a concave-convex-fit mode.

Figure 10:
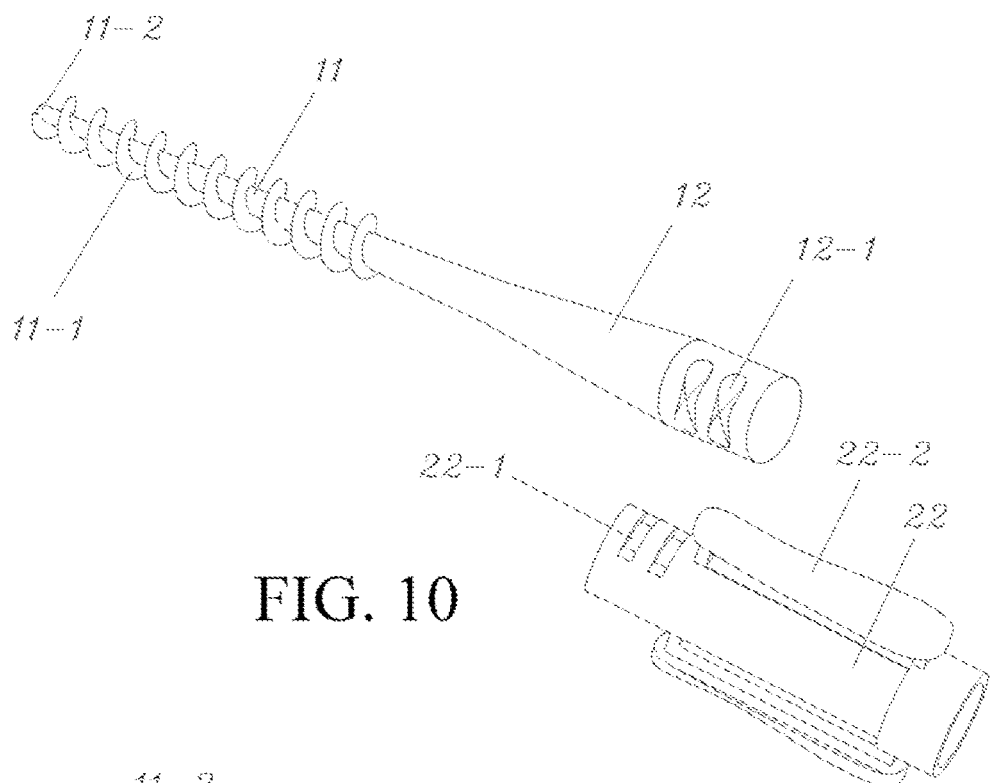
FIG. 10 is a schematic diagram of an assembly relationship between an interdental brush and a sliding mechanism of a delivery component of a built in interdental brush of the present application, where in this embodiment, fiber or a protrusion of a working part of the interdental brush is a protrusion formed by a thread structure; and the interdental brush 1 is detachably connected to the sliding mechanism 22 by means of a concave-convex-fit connection.
Figures 1, 10:
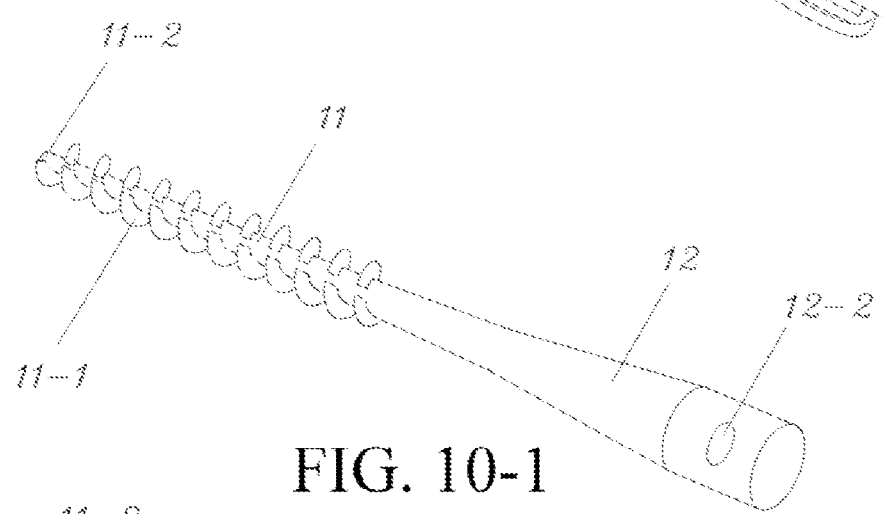
Figures 2, 10:
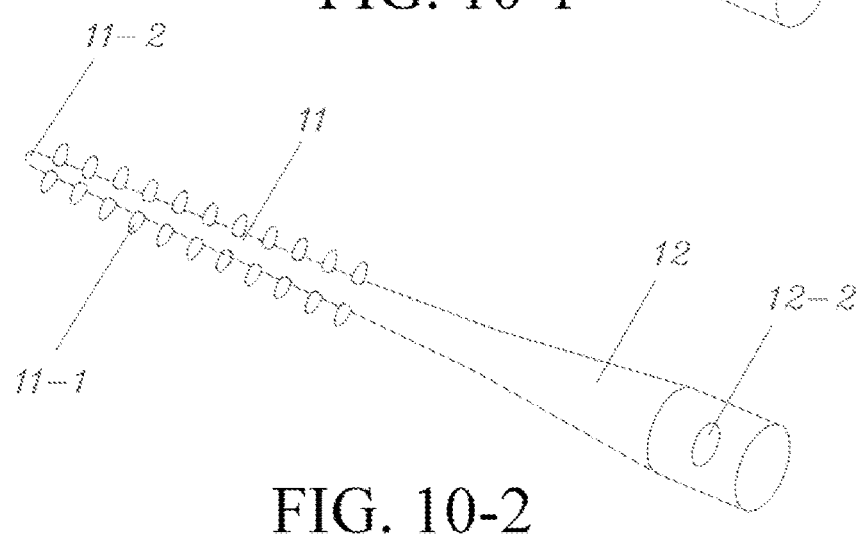

During operation, the top cover 23-1 that can be opened on the housing 23 is opened first, and the interdental brush 1 is inserted into the bended tube 21-1 of the guide head, and then the interdental brush 1 is pushed backward, and the interdental brush 1 may be fastened on the interdental brush connecting mechanism 22-1 of the sliding mechanism 22 of the delivery component 2 by using the positioning convex step 12-1 on the connector 12 of the interdental brush 1, and the top cover 23-1 is closed to finish installation of the interdental brush 1, for which refer to FIG. 8, FIG. 8-1, and FIG. 10.

After the interdental brush 1 is installed, the sliding block 22-2 of the sliding mechanism 22 is slided backward, so that the working part 11 of the interdental brush 1 is withdrew into the bended tube 21-1. The end 21-3 of the guide head of the delivery component 2 is aligned to a tooth clearance that needs to be cleaned, and the sliding block 22-2 of the sliding mechanism 22 is pushed forward slowly to make the working part 11 of the interdental brush 1 slowly extend from the bended tube 21-1 of the guide head 21 of the delivery component 2 to enter the tooth clearance for cleaning.

Because the delivery component 2 has good stiffness, after the outlet 21-2 of the bended tube of the guide head of the delivery component is aligned to the tooth clearance, the pushed out working part of the interdental brush 1 directly enters the tooth clearance, and because the outlet 21-2 of the bended tube of the guide head of the delivery component is almost close to the tooth clearance, the working part 11 of the interdental brush is hard to be bended, force delivery of the interdental brush 1 is significantly improved and controllability of the interdental brush 1 is improved.

In addition, the end 21-3 of the delivery component 2 is a smooth plane with certain strength, so at the same time when the end 21-3 acts as a stress-bearing point that plays a stress-bearing surface function when the working part 11 of the interdental brush 1 enters the tooth clearance, because of a smooth surface contact pattern, no sharp pressure will caused on the gum or a surface of the gum will not be injured, which ensures comfortableness of the human body when the working part 11 of the interdental brush 1 is pushed by the sliding block 22-2. In addition, the guide head 11-2 of the end of the working part 11 of the interdental brush 1 has a smooth cone-shaped curved surface, so when the working part 11 of the interdental brush 1 enters the tooth clearance, the working part 11 is not affected by slight position deviation, so the working part 11 enters the tooth clearance easily and does not hurt surrounding gum when entering the tooth clearance.

Because the sliding block 22-2 of the sliding mechanism 22 is a mechanism which may move back and forth, in a cleaning process, the interdental brush 1 may be driven to move back and forth in the tooth clearance by sliding the sliding block 22-2 back and forth to finish cleaning the tooth clearance successfully.

Embodiment 2: Built-In Interdental Brush Including Driving Spring of the Present Invention Referring to FIG. 2 and FIG. 2-1, a difference between this embodiment and Embodiment 1 lies in that: in this embodiment, the sliding mechanism 22 of the built-in interdental brush is further designed with a driving spring 22-3 that can push the sliding mechanism 22 to move forward. One end of the driving spring 22-3 is connected to the sliding block 22-2 and the other end is connected to the housing 23.

During operation, after the connector 12 of the interdental brush 1 is installed on the interdental brush connecting mechanism 22-1 of the sliding mechanism 22 of the delivery component 2, the sliding block 22-2 of the sliding mechanism 22 is slided backward, and the driving spring 22-3 is compressed, and the working part 11 of the interdental brush 1 is withdrew into the bended tube 21-1. The end 21-3 of the guide head of the delivery component 2 is aligned to a tooth clearance that needs to be cleaned, the sliding block 22-2 is released, the driving spring 22-3 is released, and the working part 11 of the interdental brush 1 is pushed into the tooth clearance that needs to be cleaned by using a push force of the driving spring 22-3.

Compared with Embodiment 1, during a process of using the built-in interdental brush including the driving spring, the push force applied by the driving spring 22-3 to the interdental brush is usually smaller than 100 g, so the push force applied to the interdental brush is more moderate and uniform, which may avoid push force differences to the interdental brush 1 due to differences of hand feels, and better avoid stabs to the gum.

Embodiment 3: Built-In Interdental Brush of the Present Invention in which Light Source is Front Positioned Referring to FIG. 3, a difference between this embodiment and Embodiment 2 lies in that: in this embodiment, a lighting system 24 is designed on the built-in interdental brush, and in the lighting system 24 designed on the built-in interdental brush of this embodiment, the light source is front positioned.

The lighting system 24 includes a light source system 24-1, a lighting switch 24-2, an electrical system 26, and a power system 27.

The light source system 24-1 is disposed on the guide head 21 at the front end 2-1 of the delivery component 2, the electrical system 26 and the power system 27 are located at a back end of the driving spring 22-3 and are installed in the housing 23, and the lighting switch 24-2 is disposed on the housing 23.

The light source system 24-1 uses an LED light source. By comparing the LED light source with a common light source, the LED light source is characterized by small volume, high luminous efficiency, strong light source directivity, and the like, and especially in terms of security, the LED light source has an incomparable advantage over the common light source. Firstly, the LED light source is supplied by low-voltage direct current and requires only 6V to 24V power supply voltage; secondly, mercury is not added into the LED light source, so the LED light source does not harm to the human body; and in addition, it is more important that the LED light source is a cold light source, so during operation, the LED light source is not severely hot and may be safely touched, which does not cause unexpected high-temperature scalding to the human body. Therefore, the LED light source is safety when meeting a lighting requirement. In this embodiment, the light source system 24-1 of the lighting system 24 is disposed on the guide head 21 at the front end 2-1 of the delivery component; therefore, because a working area of the light source system 24-1 is inner oral cavity, using the LED light source may meet the lighting requirement and also a human body safety requirement.

During operation, the connector 12 of the interdental brush 1 is installed on the interdental brush connecting mechanism 22-1 of the sliding mechanism 22 of the delivery component 2, the lighting switch is turned on, the electrical system 26 is used to connect the light source system 24-1 to the power system 27, and the light source system 24-1 emits required lighting. The sliding block 22-2 of the sliding mechanism 22 is slided backward, the driving spring 22-3 is compressed, and the working part 11 of the interdental brush is withdrew into the bended tube 21-1. The end 21-3 of the guide head of the delivery component 2 is aligned to a tooth clearance that needs to be cleaned, the sliding block 22-2 is released, the driving spring 22-3 is released, and the working part 11 of the interdental brush 1 is pushed into the tooth clearance that needs to be cleaned by using a push force of the driving spring 22-3.

Compared with Embodiment 2, the lighting system 24 is designed on the guide head 21 at the front end 2-1 of the delivery component, and a user may clearly observe the inner oral cavity during the whole operation process in the lighting that is emitted from the light source system 24-1 of the lighting system 24, thereby better locating and cleaning, and effectively avoiding unexpected gum injury due to poor visibility caused by dark light of the inner oral cavity.

Figure 4:
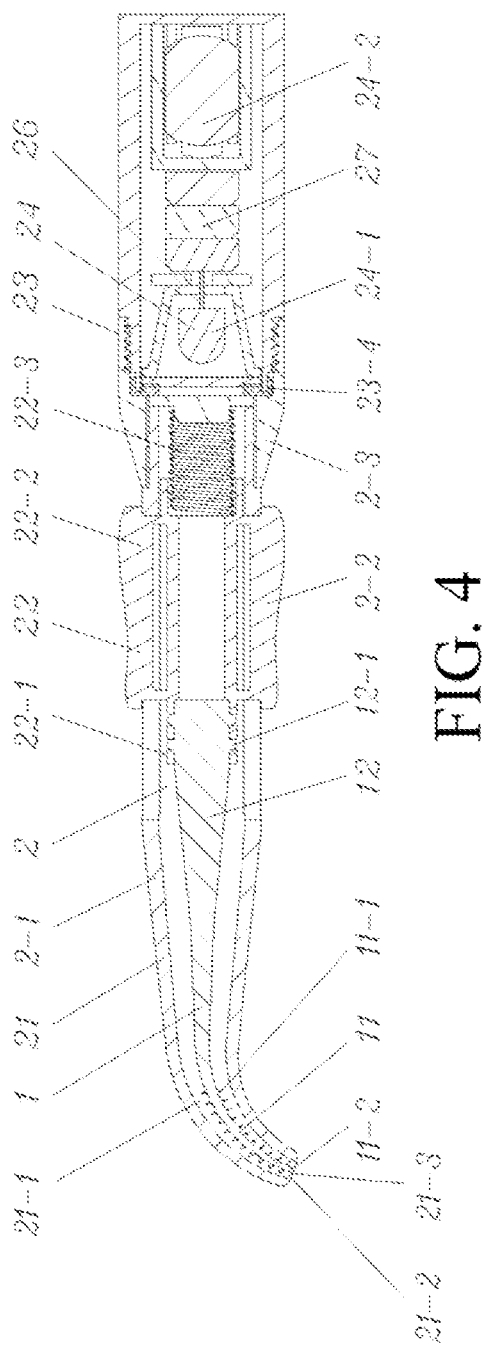
FIG. 4 is a schematic structural diagram of a built-in interdental brush of the present application in which a light source is back positioned.

Embodiment 4: Built-In Interdental Brush of the Present Invention in which Light Source is Back Positioned Referring to FIG. 4, a difference between this embodiment and Embodiment 3 lies in that: in this embodiment, the light source system 24-1 of the lighting system 24 on the built-in interdental brush is disposed at a back end of the guide head (21) in the middle (2-2) of the delivery component and is located at a back end of the driving spring 22-3 and a front portion of the power system 27, and the light source system 24-1 is connected to the lighting switch 24-2 by using the electrical system 26.

In this embodiment, the guide head 21 of the delivery component 2 is made of optical transmission material polymethylmethacrylate, that is, the guide head 21 of the delivery component 2 is made of commonly known acrylic material. By using an optical transmission function of the guide head 21, lighting emitted from the light source system 24-1 is transmitted to the end 21-3 of the guide head.

The light source system 24-1 uses an LED light source. Because the LED light source has better light source directivity than the common light source, the LED light source may better transmit the lighting and meet the lighting requirement during use.

In order to increase safety during use, the light source system 24-1, the electrical system 26, and the power system 27 are all installed in the housing 23, and they are connected to each other to form a whole by using the lighting switch 24-2. The housing 23 is connected to the guide head 21 by means of a threaded connection, and a sealing ring 23-4 is disposed at the threaded connection, which prevents insecurities such as leakage of electricity due to its contact with liquids such as water and is more safety.

During operation, the connector 12 of the interdental brush 1 is installed on the interdental brush connecting mechanism 22-1 of the sliding mechanism 22 of the delivery component 2, the lighting switch 24-2 is turned on to let the light source system 24-1 emit required lighting, and by using the optical transmission function of the guide head 21, the lighting emitted from the light source system 24-1 is transmitted to the end 21-3 of the guide head. Then, the sliding block 22-2 of the sliding mechanism 22 is slided backward, the driving spring 22-3 is compressed, and the working part 11 of the interdental brush 1 is withdrew into the bended tube 21-1. The end 21-3 of the guide head of the delivery component 2 is aligned to a tooth clearance that needs to be cleaned, the sliding block 22-2 is released, the driving spring 22-3 is released, and the working part 11 of the interdental brush 1 is pushed into the tooth clearance that needs to be cleaned by using a push force of the driving spring 22-3.

Compared with Embodiment 3, the lighting system 24 is designed to a whole structure enclosed in the housing 23, which can be cleaned by water and is more safety.

Figure 5:
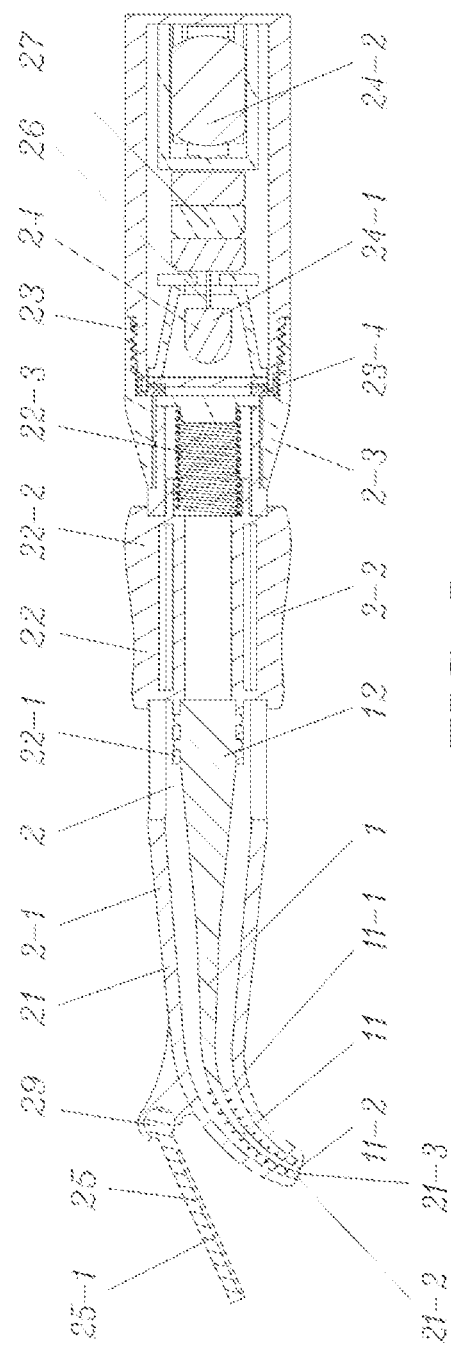
FIG. 5 is a schematic structural diagram of a built-in interdental brush including an observation mirror of the present application.

Embodiment 5: Built-In Interdental Brush Including Observation Mirror of the Present Invention Referring to FIG. 5, a difference between this embodiment and Embodiment 4 lies in that: in this embodiment, the built-in interdental brush is further provided with an observation system 25. The observation system 25 is an observation mirror 25-1, and the observation mirror 25-1 is connected to the guide head 21 at an adjustable angle by means of a shaft connection or a ball joint connection 29.

During operation, the connector 12 of the interdental brush 1 is installed on the interdental brush connecting mechanism 22-1 of the sliding mechanism 22 of the delivery component 2, the lighting switch 24-2 is turned on to let the light source system 24-1 emit required lighting, the sliding block 22-2 of the sliding mechanism 22 is slided backward, the driving spring 22-3 is compressed, and the working part 11 of the interdental brush is withdrew into the bended tube 21-1. After a displaying function of the observation mirror 25-1 is used to observe a location of a tooth clearance, the end 21-3 of the guide head of the delivery component 2 is aligned to a tooth clearance that needs to be cleaned, the sliding block 22-2 is released, the driving spring 22-3 is released, and the working part 11 of the interdental brush 1 is pushed into the tooth clearance that needs to be cleaned by using a push force of the driving spring 22-3.

Compared with Embodiment 4, because the observation mirror 25-1 used for observation is designed on the guide head 21, during use, a user may conveniently observe a structure of an inner oral cavity, especially a tooth clearance between molars, more conveniently by using the observation mirror 25-1, and better align the end 21-3 of the guide head to the tooth clearance that needs to be cleaned.

Figure 6:
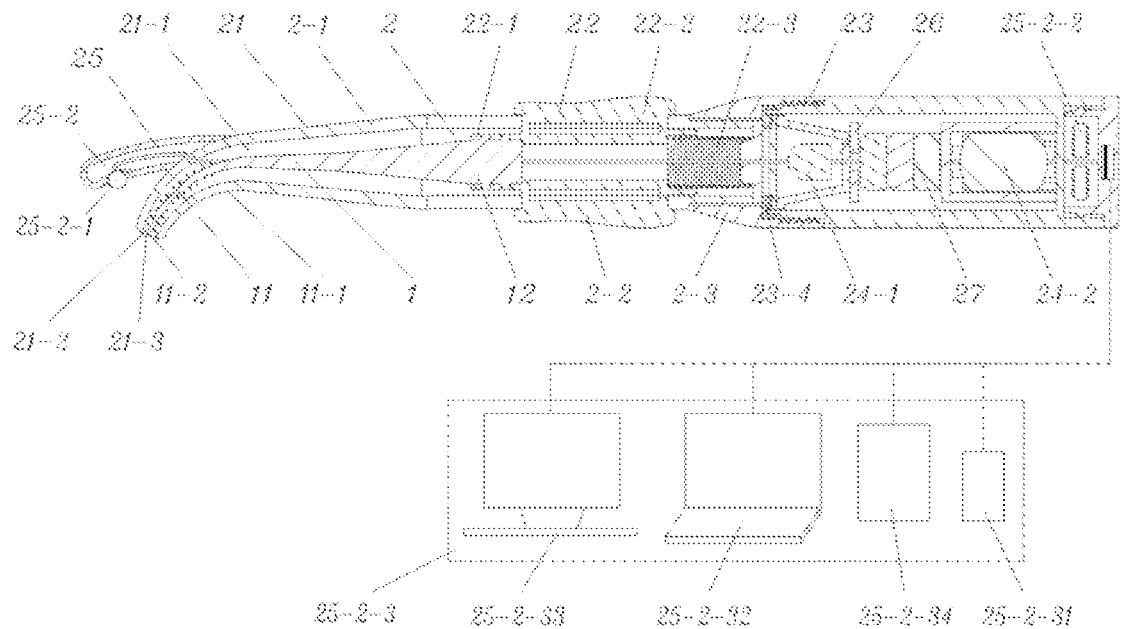
FIG. 6 is a schematic structural diagram of a built-in interdental brush including a camera system of the present application.

Embodiment 6: Built-In Interdental Brush Including Camera System of the Present Invention Referring to FIG. 6, a difference between this embodiment and Embodiment 5 lies in that: in this embodiment, the observation system of the built-in interdental brush is a camera system 25-2.

The camera system 25-2 includes a camera 25-2-1, a data processing and outputting system 25-2-2, the electrical system 26, and the power system 27. The camera 25-2-1 is disposed on the guide head 21 at the front end of the delivery component 2.

Video data output by the data processing and outputting system 25-2-2 of the camera system 25-2 can be displayed on a display 25-2-3 by means of a wired connection or a wireless connection, where the display 25-2-3 may use a smart phone 25-2-31, or a computer 25-2-32, or a liquid crystal display 25-2-33, or a television 25-2-34.

During operation, by using a lighting function of lighting of the light system 24-1 transmitted by the guide head 21, after the camera 25-2-1 of the camera system 25-2 is used to perform real-time photography for the operation process, an image and a video that are taken are transmitted to the external display 25-2-3 by using the data processing and outputting system 25-2-2. A user may use the external display 25-2-3 to directly observe a structure of an inner oral cavity and a working state of the interdental brush 1 during a cleaning process.

The built-in interdental brush including the camera system of the present application may directly transmit a video image of a tooth clearance that is taken to a carry-on smart phone or a tablet, and therefore, within few minutes, the tooth clearance may be cleaned safely and quickly in a visible state.

Figure 7:
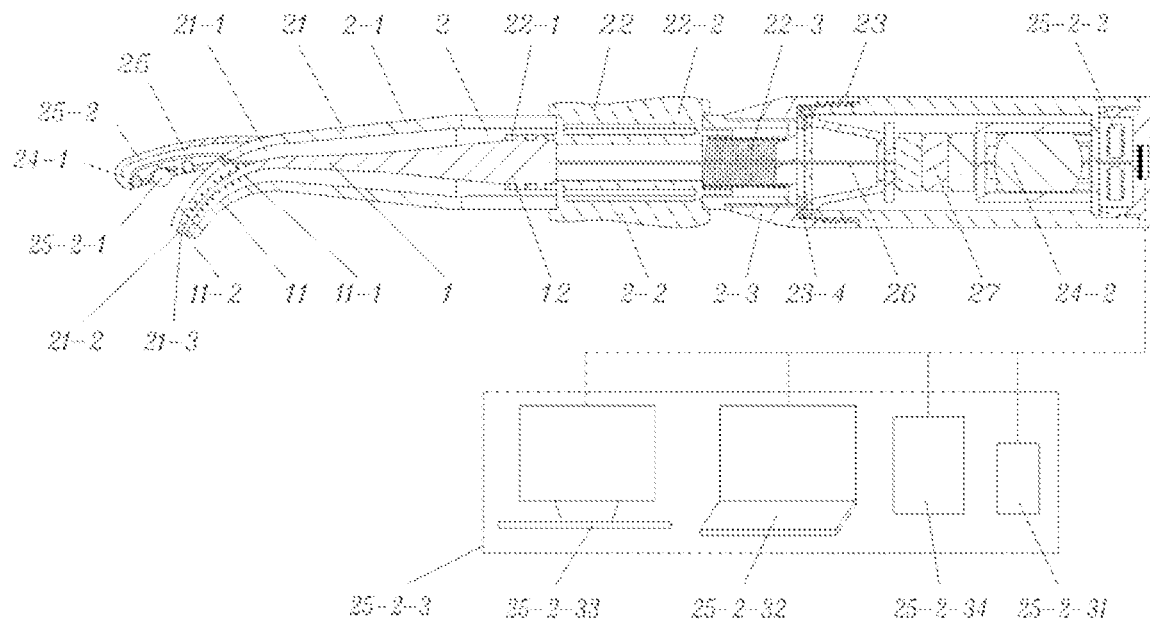
FIG. 7 is a schematic structural diagram of a built-in interdental brush in which a light source and a camera are both disposed on a guide head of a delivery component of the present application.

Embodiment 7: Built-In Interdental Brush in which Light Source and Camera are Both Disposed on Guide Head of Delivery Component of the Present Invention Referring to FIG. 7, a difference between this embodiment and Embodiment 6 lies in that: in the built-in interdental brush in this embodiment, the light system 24-1 for providing lighting for the camera system 25 is disposed surround the camera 25-1.

Compared with Embodiment 6, because the light system 24-1 is disposed surround the camera 25-1, the light system 24-1 may perform lighting for the camera 25-1 instead of transmitting lighting of the back-positioned light system 24-1 by using an optical transmission function of the guide head 21, thereby reducing loss during an optical transmission process and better performing lighting for the camera 25-1 and saving more energy.

Embodiment 8: Built-In Interdental Brush Including Storage Space of the Present Invention Referring to FIG. 8 to FIG. 8-3, a difference between this embodiment and Embodiment 4 lies in that, a storage compartment 28 is disposed on a tail 2-3 of the delivery component 2 of the built-in interdental brush in this embodiment. The storage compartment 28 can at least store one interdental brush 1, one toothbrush 3, and one tooth paste 4. Because the storage compartment 28 is disposed on the tail 2-3 of the delivery component, and the storage compartment 28 can store the interdental brush 1, the toothbrush 3, and the tooth paste 4, it is convenient for users to timely clean their oral cavities after meals when they go out.

Referring to FIG. 8-1 and FIG. 8-2, the top cover 23-1 that can be opened on the housing 23 is opened, the interdental brush 1 is inserted into the bended tube 21-1 of the guide head 21 of the delivery component 2, the interdental brush 1 is pushed backward, the connector 12 of the interdental brush is pushed into the interdental connecting mechanism 22-1, the connector 12 is detachably fastened on the interdental brush connecting mechanism 22-1 by means of concave-convex-fit, and the top cover 23-1 is closed, so that an installation process of the interdental brush 1 is finished.

Figure 3:
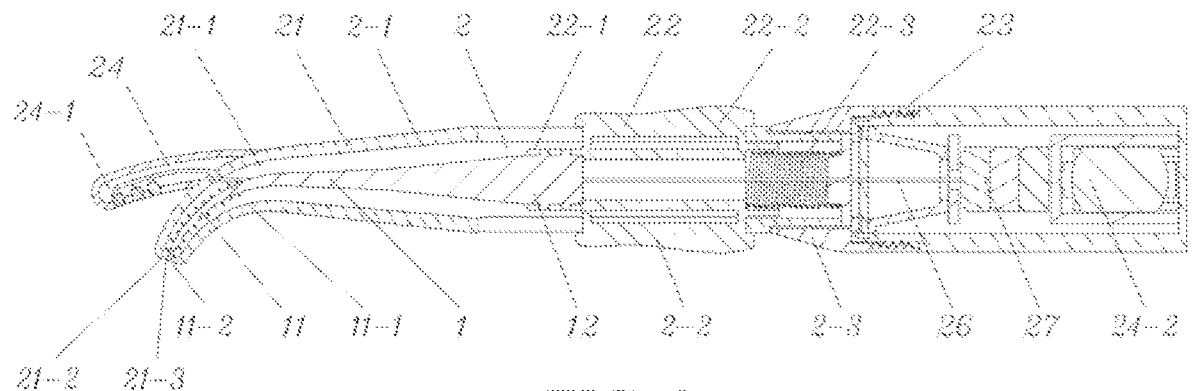
FIG. 3 is a schematic structural diagram of a built-in interdental brush of the present application in which a light source is front positioned.

Referring to FIG. 8-2 and FIG. 8-3, during operation, the lighting switch 24-2 is turned on and the light source system 24-1 is connected to the power system 27 by using the electrical system 26 to let the light source system 24-1 emit required lighting, and by using an optical transmission function of the guide head 21, the lighting emitted from the light source system 24-1 is transmitted to the end 21-3 of the guide head. Then, the sliding block 22-2 of the sliding mechanism 22 is slided backward, the driving spring 22-3 is compressed, and the working part 11 of the interdental brush is withdrew into the bended tube 21-1. The end 21-3 of the guide head of the delivery component 2 is aligned to a tooth clearance that needs to be cleaned, the sliding block 22-2 is released, the driving spring 22-3 is released, and the working part 11 of the interdental brush 1 is pushed into the tooth clearance that needs to be cleaned by using a push force of the driving spring 22-3.

To replace the interdental brush 1, the top cover 23-1 at the front end of the delivery component 2 is opened first, the interdental brush 1 is pushed forward, and the connector 12 of the interdental brush 1 is detached from a concave-convex-fit groove of the interdental brush connecting mechanism 22-1, and then the interdental brush 1 is taken out from the bended tube 21-1 of the guide head, and after an interdental brush that needs to be installed is installed according to the foregoing steps, the top cover 23-1 at the front end of the delivery component 2 is closed.

The storage compartment 28 is connected to the housing 23 by means of concave-convex-fit, and the toothbrush 3 is detachably fastened in the storage compartment 28 by means of concave-convex-fit. When the toothbrush 3 in the storage compartment 28 is used to perform oral cavity cleaning, the storage compartment 28 is detached from the housing 23, and other backup objects in the storage compartment 28 are taken, such as the interdental brush 1 and the tooth paste 4, then the backup toothbrush 3 in the storage compartment 28 can be used to perform the oral cavity cleaning. After the cleaning, the taken-out interdental brush 1 and the tooth paste 4 are repositioned to the storage compartment 28, and the storage compartment 28 is reconnected to the housing.

Embodiment 9: Built-In Interdental Brush in which Toothbrush is Disposed at Tail of Delivery Component Referring to FIG. 9 to FIG. 9-2, this embodiment provides a built-in interdental brush in which a foldable toothbrush is disposed at a tail of the delivery component.

The built-in interdental brush of the present application includes the interdental brush 1, the delivery component 2, and the toothbrush 3.

Figure 9:
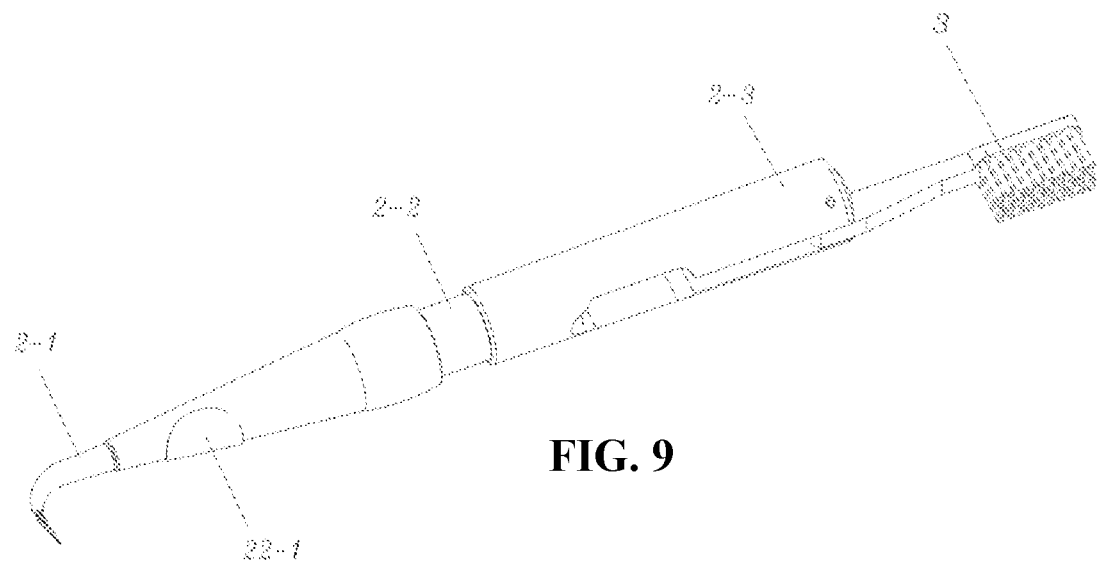
FIG. 9 is a schematic structural diagram of a built-in interdental brush in which a toothbrush is disposed at a tail of a delivery component of the present application.
Figures 1, 9:
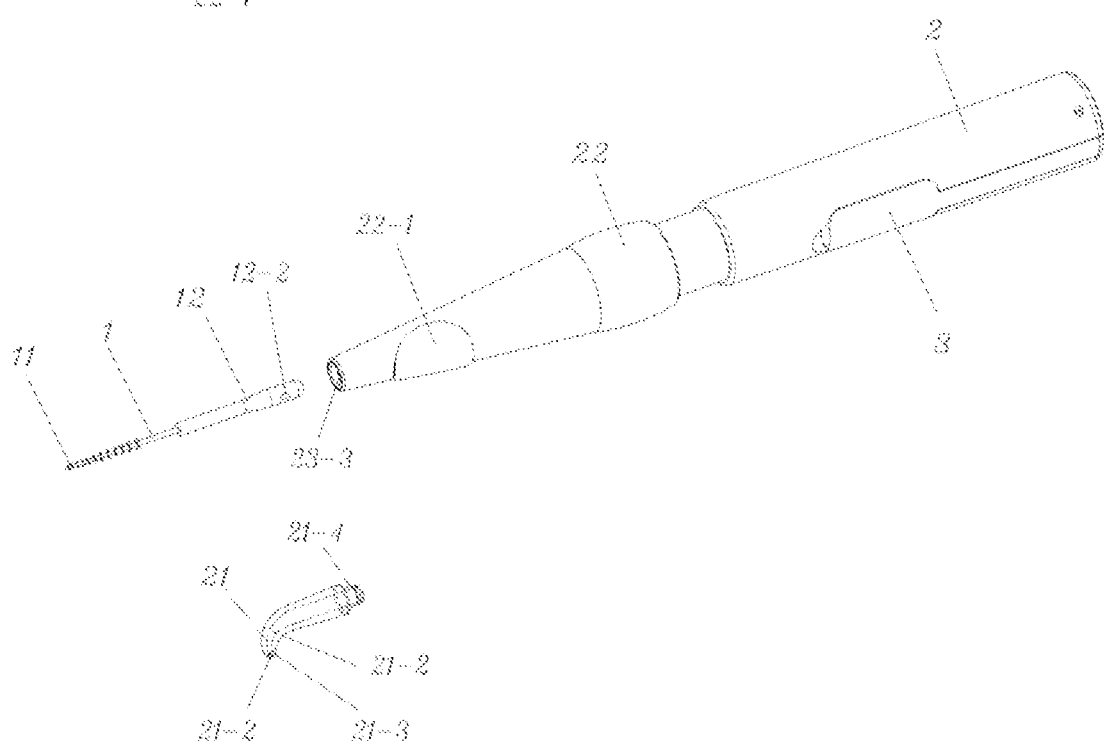
Figures 2, 9:
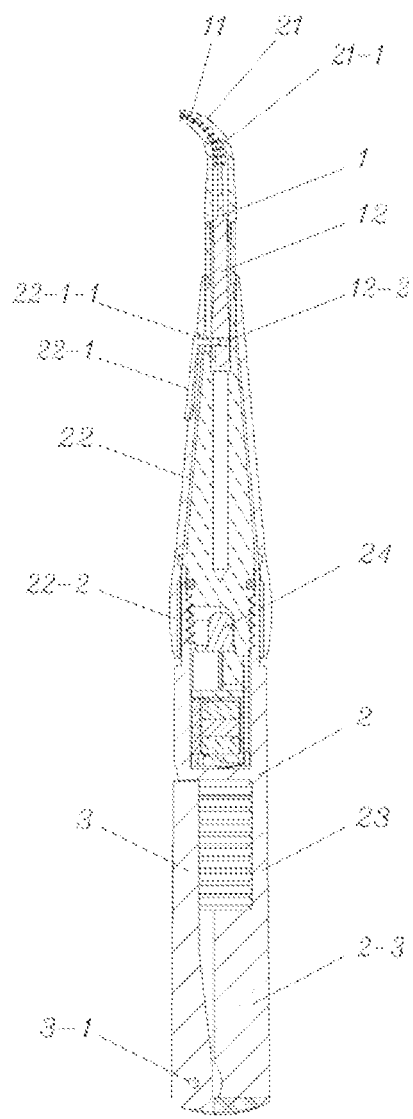
Figures 3, 9:
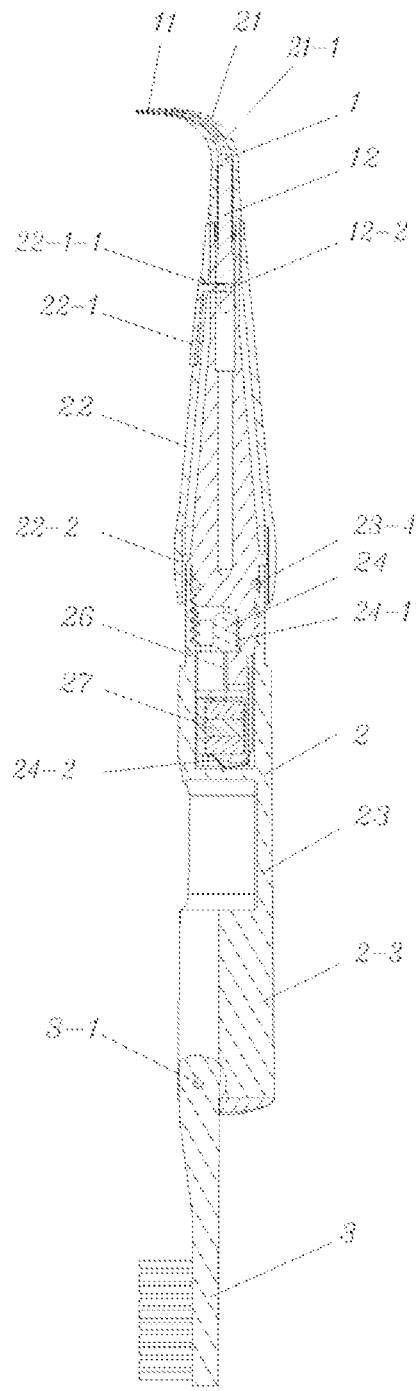

The guide head 21 is connected to a positioning groove 23-3 of the housing 23 by means of concave-convex-fit by using a positioning convex step 21-4, for which refer to FIG. 9-1.

The delivery component 2 includes a back-positioned lighting system 24. The lighting system 24 includes the light source system 24-1, the lighting switch 24-2, the electrical system 26, and the power system 27. The light system 24-1 of the lighting system 24 is disposed at a back end of the guide head (21) in the middle (2-2) of the delivery component and front portion of the power system 27, and the light system 24-1 is connected to the lighting switch 24-2 by using the electrical system 26. By using an optical transmission function of the guide head 21, lighting emitted from the light source system 24-1 is transmitted to the end 21-3 of the guide head.

The light source system 24-1, the electrical system 26, and the power system 27 are all installed in the housing 23, and they are connected to each other to form a whole by using the lighting switch 24-2. The housing 23 is connected to the guide head 21 by means of a threaded connection, and a sealing ring 23-4 is disposed at the threaded connection, which prevents water from entering the lighting system 24, for which refer to FIG. 9-2 and FIG. 9-3.

The toothbrush 3 is disposed at the tail 2-3 of the delivery component 2. The toothbrush 3 is connected to a tail of the housing 23 in a rotatable manner by using a rotation shaft 3-1.

During operation, the guide head 21 is taken from the positioning groove 23-3 of the housing 23, the interdental brush 1 is pushed, so that a positioning convex step 22-1-1 of an interdental brush connecting mechanism 22-1 of the delivery component 2 is stuck into a positioning hole 12-2 on a connector 12 of the interdental brush 1, so a connection between the interdental brush 1 and the sliding mechanism 22 is completed. Then, the guide head 21 is reconnected to the housing 23 by means of concave-convex-fit.

By looking from the tail of the delivery component 2, the housing 23 is rotated in the clockwise direction, and the lighting switch 24-2 is pressed; therefore, the lighting system is connected and the light source system 24-1 emits required lighting.

Then, the sliding block 22-2 of the delivery component 2 is slided backward, and the working part 11 of the interdental brush 1 is withdrew into the bended tube 21-1. The end 21-3 of the guide head of the delivery component 2 is aligned to a tooth clearance that needs to be cleaned, and the sliding block 22-2 of the sliding mechanism 22 is pushed forward slowly to make the working part 11 of the interdental brush 1 slowly extend from the bended tube 21-1 of the guide head 21 of the delivery component 2, after the working part 11 of the interdental brush 1 enters the tooth clearance, the sliding block 22-2 is slided back and forth to drive the working part 11 of the interdental brush 1 moves back and forth in the tooth clearance for cleaning.

When the interdental brush 1 needs to be replaced, the guide head 21 is taken from the positioning groove 23-3 of the housing 23, and the interdental brush 1 and the delivery component 2 are separated forcibly, and then the interdental brush 1 may be extracted from the front end of a sliding mechanism 22, and a new interdental brush 1 may be reinstalled. After the replacement, the interdental brush 1 is disposed in the bended tube 21-1 of the guide head 21 of the delivery component 2, and then the guide head 21 and the housing 23 are reconnected to form a whole.

When the toothbrush 3 needs to be used for cleaning, the toothbrush 3 is rotated around the rotation shaft 3-1, and the toothbrush 3 is opened to use. After use, the toothbrush 3 is folded and put back.

In addition, the fiber or the protrusion 11-1 involved in the built-in interdental brush of the present application has different design manners, for which refer to FIG. 10 to FIG. 10-2.

In FIG. 10, the brush 1 is made of elastic material in one piece, and the elastic material may be nickel titanium shape memory alloys, polyurethane, low-density polyethylene, silicon dioxide, or medical rubber. In this embodiment, the fiber or the protrusion 11-1 of the interdental brush 1 may use a protrusion formed by a screw structure, a smooth cone is disposed at a front end of the interdental brush 1 as the guide head 11-2, and a positioning convex step 12-1 connected to the sliding mechanism 22 of the delivery 2 is disposed at a back end of the interdental brush 1. The interdental brush 1 is detachably connected to the sliding mechanism 22 by means of a concave-convex-fit connection.

Referring to FIG. 10-1, the fiber or the protrusion 11-1 of the interdental brush 1 may also use a structure of vane-type protrusion, and a positioning hole 12-2 is disposed on the connector 12 that is connected to the sliding mechanism 22 of the delivery component 2. The vane-type protrusion 11-1 is disposed on the working part 11 of the interdental brush 1.

Referring to FIG. 10-2, the fiber or the protrusion 11-1 of the interdental brush 1 may also use a structure of fibrous protrusion, and a positioning hole 12-2 is disposed on the connector 12 that is connected to the sliding mechanism 22 of the delivery component 2. The fibrous protrusion 11-1 is disposed on the working part 11 of the interdental brush 1.

The foregoing embodiments relate to the built-in interdental brush. However, many technical features thereof are not limited to the built-in interdental brush. For example, the front-positioned light source lighting system and the back-positioned light source light system described in the foregoing embodiments are not limited to the built-in interdental brush. The following embodiments focus on a lighting-enabled interdental brush having different types of configurations of lighting systems.

Embodiment 10: Visual Interdental Brush of the Present Invention in which Light Source is Front Positioned Referring FIG. 11, a lighting-enabled interdental brush of the present application includes an interdental brush 1 and a delivery component 2.

The interdental brush 1 includes a working part 11 with fiber or a protrusion 11-1 and a connector 12, where a positioning convex step 12-1 is disposed on the connector 12 and the working part 11 is disposed at a front end of the connector 12.

In the interdental brush 1, the protrusion 11-1 of the thread structure of the working part 11 of the interdental brush is made of elastic polymer material, and the connector 12 is made of elastic metallic material. By using an injection molding process in a metal mold, the connector 12 made of the elastic metallic material and the fiber or the protrusion 11-1 made of elastic polymer material are formed into a whole, so as to form the interdental brush 1.

The delivery component 2 includes a guide head 21, a housing 23, and a lighting system 24.

The guide head 21 is installed at a front end of the housing 23.

The lighting system 24 includes a light source system 24-1, a lighting switch 24-2, an electrical system 26, and a power system 27.

The light source system 24-1 is disposed at the front end of the guide head 21 of the delivery component 2, the electrical system 26 and the power system 27 are installed in the housing 23, the lighting switch 24-2 is disposed on the housing 23, and the light source system 24-1, the power system 26, and the lighting switch 24-2 are connected together by using the electrical system 26.

The interdental brush 1 is fastened on the guide head 21 at a front end of the delivery component 2 by means of overall injection molding, and forms a whole with the delivery component 2.

During operation, the lighting switch 24-2 is turned on and the light source system 24-1 is connected to the power system 27 by using the electrical system 26 to let the light source system 24-1 emit required lighting. After observation by using a lighting function of the lighting of the light source system 24-1, the end of the working part 11 of the interdental brush 1 is aligned to a tooth clearance that needs to be cleaned, and the working part 11 of the interdental brush 1 is pushed into the tooth clearance for cleaning, and the working part 11 of the interdental brush 1 moves back and forth in the tooth clearance that needs to be cleaned by moving the delivery component 2 back and forth, so as to achieve the objective of cleaning the tooth clearance.

Figure 12:
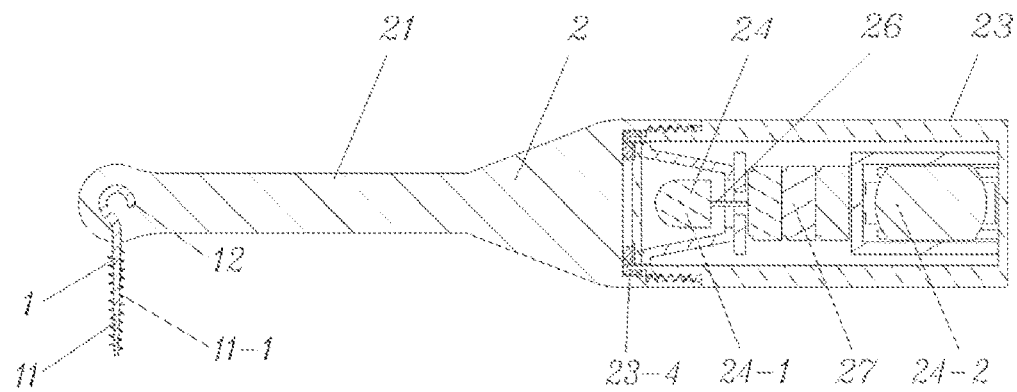
FIG. 12 is a schematic structural diagram of an interdental brush of the present application in which a light source is back positioned, where in this embodiment, the lighting source is installed in a housing of a delivery component.

Embodiment 11: Visual Interdental Brush of the Present Invention in which Light Source is Back Positioned Referring to FIG. 12, a difference between this embodiment and Embodiment 10 lies in that: the light source system 24-1 of the lighting system 24 on the lighting-enabled interdental brush of this embodiment is similar to the embodiment of FIG. 4, the light source system 24-1 of the lighting system 24 on the lighting-enabled interdental brush is disposed at a back end of the guide head 21 of the delivery component 2 and at a front portion of the power system 27, and the light source system 24-1 is connected to the lighting switch 24-2 by using the electrical system 26.

The guide head 21 of the delivery component 2 is made of optical transmission material. In this embodiment, the guide head 21 of the delivery component 2 is made of polymethylmethacrylate, that is, the guide head 21 of the delivery component 2 is made of commonly known acrylic material.

Figure 11:
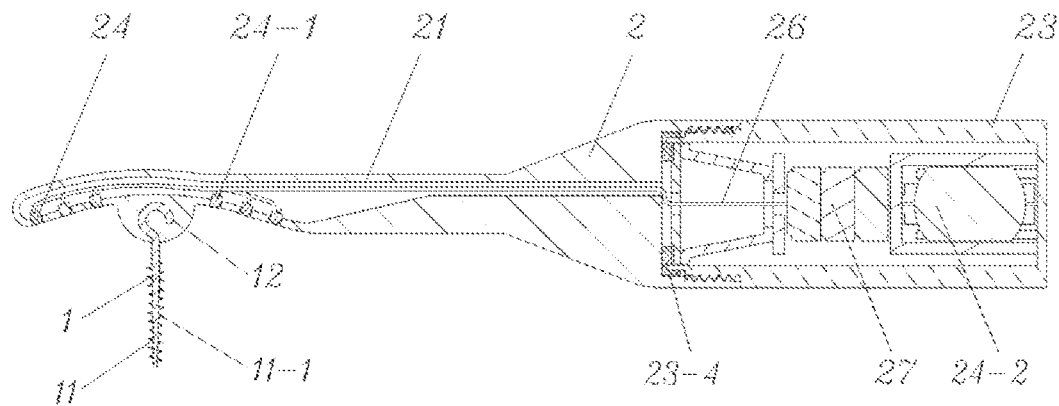
FIG. 11 is a schematic structural diagram of a lighting-enabled interdental brush of the present application in which a light source is front positioned, where in this embodiment, the lighting source is installed at a front end of a guide head of a delivery component.

The working mode of this embodiment is similar to Embodiment 10 in FIG. 11. However, compared with Embodiment 10, the lighting system 24 is designed to a whole structure enclosed in the housing 23, which can be cleaned by water and is more safety.

Figure 13:
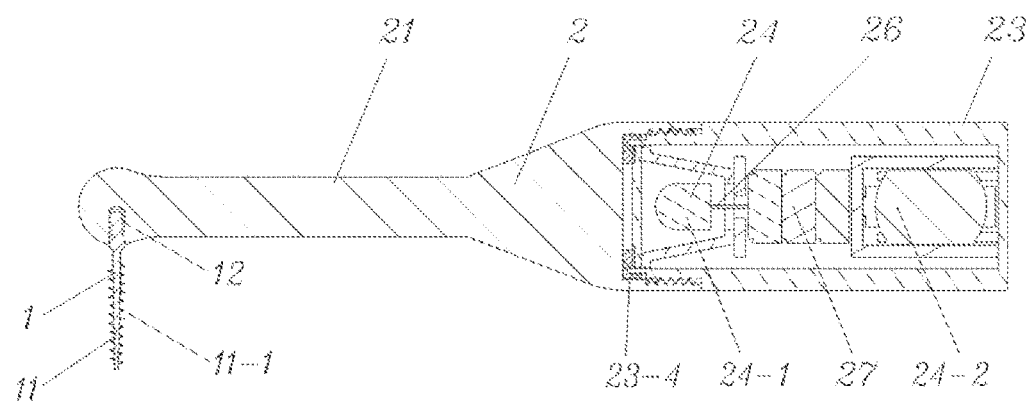
FIG. 13 is a schematic structural diagram of a lighting-enabled interdental brush of a threaded connection type of the present application, where in this embodiment, the interdental brush is connected to a delivery component in a threaded connection mode to form a whole.

Embodiment 12: Visual Interdental Brush of Threaded Connection Type of the Present Invention Referring to FIG. 13, a difference between this embodiment and Embodiment 11 lies in that: in this embodiment, the connector 12 of the interdental brush 1 of the lighting-enabled interdental brush is connected to the guide head 21 of the delivery component 2 by means of a threaded connection. Because the interdental brush 1 is connected to the delivery component 2 by means of a detachable connection, which is convenient for replacement of the interdental brush 1 and significantly reduces use cost.

During operation, the connector 12 of the interdental brush 1 is rotated first, and the interdental brush 1 is fastened to the guide head 21 of the delivery component 2 by using thread on the connector 12. Then, the lighting switch 24-2 is turned on, a lighting function of lighting of the light source system 24-1 is used, the end of the working part 11 of the interdental brush 1 is aligned to a tooth clearance that needs to be cleaned, and the working part 11 of the interdental brush 1 is pushed into the tooth clearance for cleaning.

When the interdental brush 1 needs to be replaced, the connector 12 of the interdental brush 1 is rotated backward, the interdental brush 1 is detached from the guide head 21 of the delivery component 2, and then a new interdental brush 1 is installed.

Figure 14:
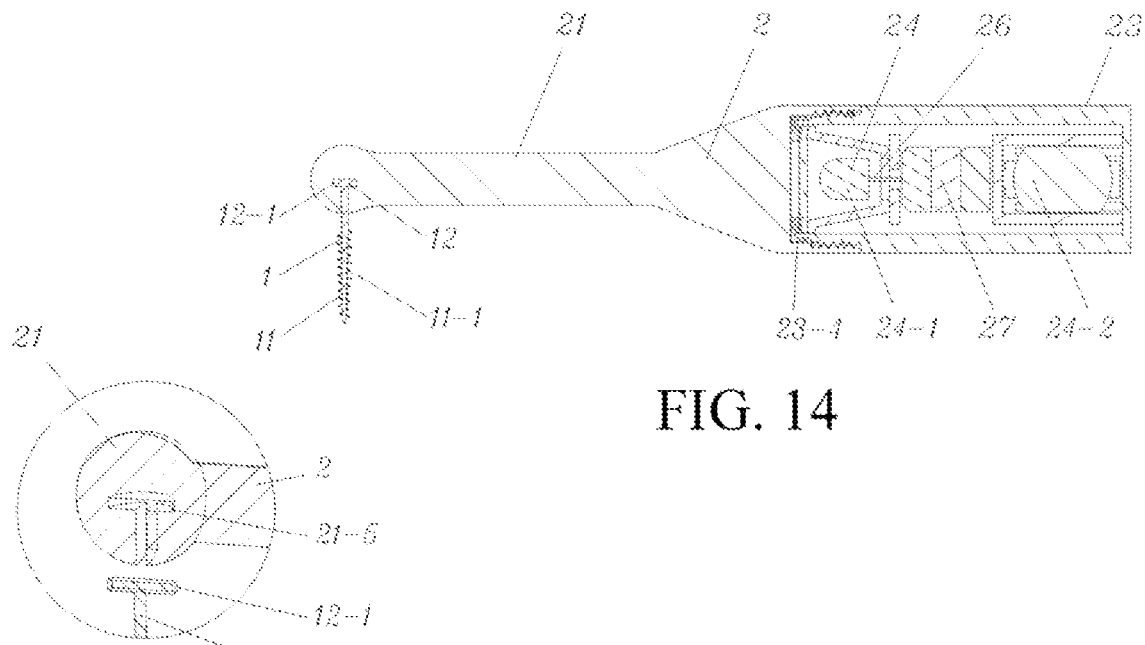
FIG. 14 is a schematic structural diagram of a lighting-enabled interdental brush of a concave-convex-fit type of the present application, where in this embodiment, the interdental brush is connected to the delivery component in a concave-convex-fit mode to form a whole.
Figures 1, 14:
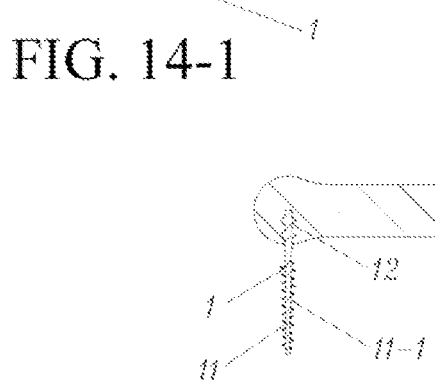

Embodiment 13: Visual Interdental Brush of Concave-Convex-Fit Connection Type of the Present Invention Referring to FIG. 14 and FIG. 14-1, a difference between this embodiment and Embodiment 12 lies in a different detachable connection mode between the interdental brush 1 and the delivery component 2 of the lighting-enabled interdental brush of this embodiment. In Embodiment 12, a threaded connection mode is used, while in this embodiment, a concave-convex-fit detachable connection mode is used.

During operation, a connection convex step 12-1 of the connector 12 of the interdental brush 1 is put into a connection groove 21-5 of the guide head 21 of the delivery component 2, the connector 12 of the interdental brush 1 is rotated, the connection convex step 12-1 of the connector 12 is stuck into the connection groove 21-5 of the guide head 21 and fastened, then installation of the interdental brush 1 is finished. Then, the lighting switch 24-2 is turned on, a lighting function of lighting of the light source system 24-1 is used, the end of the working part 11 of the interdental brush 1 is aligned to a tooth clearance that needs to be cleaned, and the working part 11 of the interdental brush 1 is pushed into the tooth clearance for cleaning.

When the interdental brush 1 needs to be replaced, the connector 12 of the interdental brush 1 is rotated backward, the interdental brush 1 is detached from the guide head 21 of the delivery component 2, and then a new interdental brush 1 is installed.

Figure 15:
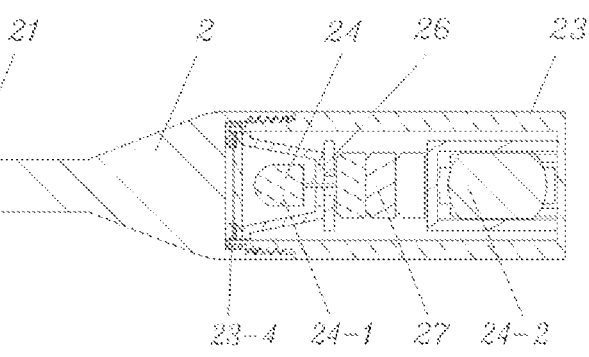
FIG. 15 is a schematic structural diagram of a lighting-enabled interdental brush of an interference-fit type of the present application, where in this embodiment, the interdental brush is connected to the delivery component in an interference-fit mode to form a whole.

Embodiment 14: Visual Interdental Brush of Interference-Fit Connection Type of the Present Invention Referring to FIG. 15, a difference between this embodiment, Embodiment 12, and Embodiment 13 lies in that, in this embodiment, an interference-fit detachable connection mode is used to connect the interdental brush 1 and the delivery component 2.

During operation, the connector 12 of the interdental brush 1 is directly pushed into the connection groove 21-5 of the guide head 21 of the delivery component 2, so that installation of the interdental brush 1 is finished. Then, the lighting switch 24-2 is turned on, a lighting function of lighting of the light source system 24-1 is used, the end of the working part 11 of the interdental brush 1 is aligned to a tooth clearance that needs to be cleaned, and the working part 11 of the interdental brush 1 is pushed into the tooth clearance for cleaning.

When the interdental brush 1 needs to be replaced, the interdental brush 1 is directly extracted from the connection groove 21-5 of the guide head 21 of the delivery component 2, and then a new interdental brush is installed.

Figure 16:
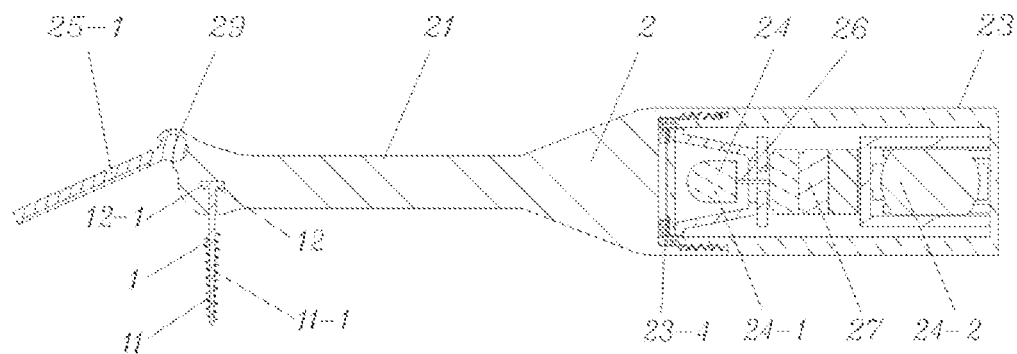
FIG. 16 is a schematic structural diagram of a lighting-enabled interdental brush including an observation mirror of the present application, where in this embodiment, the observation mirror is installed at a front end of a guide head of the delivery component by means of a shaft connection or a ball joint connection.

Embodiment 15: Visual Interdental Brush Including Observation Mirror of the Present Invention Referring to FIG. 16, a difference between this embodiment and Embodiment 13 lies in that: in this embodiment, the lighting-enabled interdental brush is further provided with an observation system 25. The observation system 25 is an observation mirror 25-1, and the observation mirror 25-1 is connected to the guide head 21 of the delivery component 2 at an adjustable angle by means of a ball joint connection or a shaft connection 29.

During operation, the lighting switch 24-2 is turned on, a displaying function of the observation mirror 25-1 is used to observe a location of a tooth clearance, the end of the working part 11 of the interdental brush 1 is aligned to a tooth clearance that needs to be cleaned, and the working part 11 of the interdental brush 1 is pushed into the tooth clearance for cleaning.

Compared with Embodiment 1, because the observation mirror 25-1 used for observation is designed on the guide head 21, during use, a user may conveniently observe a structure of an inner oral cavity by using the observation mirror 25-1 and better align the end of the working part 11 of the interdental brush 1 to the tooth clearance that needs to be cleaned.

Figure 17:
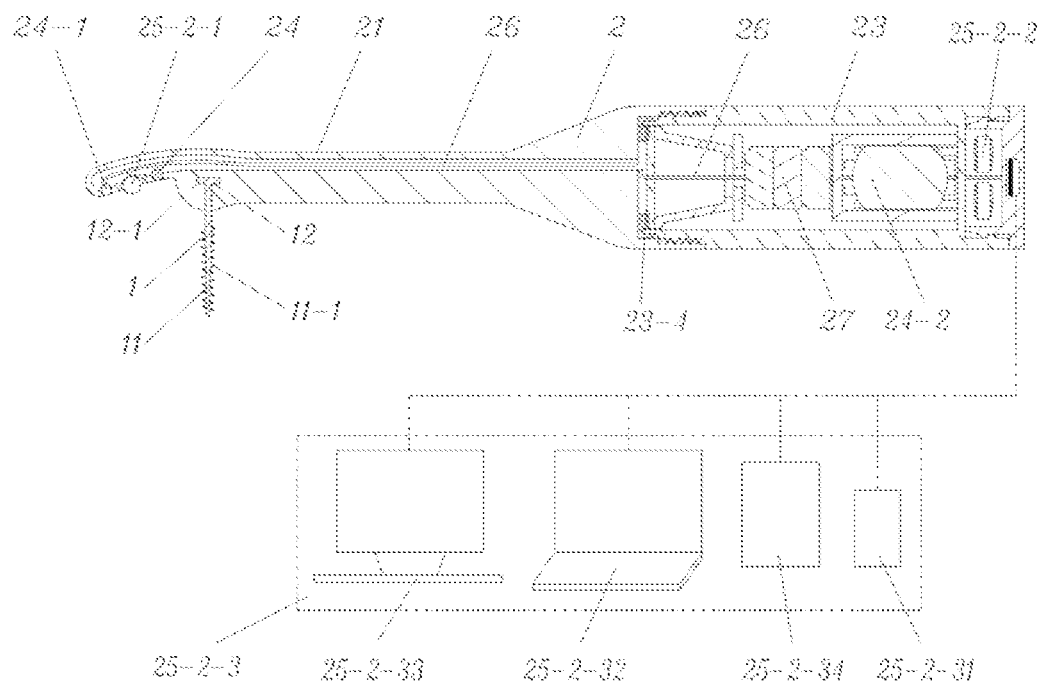
FIG. 17 is a schematic structural diagram of a lighting-enabled interdental brush including a camera system of the present application, where in this embodiment, a light source for providing lighting is disposed surround the camera.

Embodiment 16: Visual Interdental Brush Including Camera System of the Present Invention Referring to FIG. 17, a difference between this embodiment and Embodiment 15 lies in that: in this embodiment, the observation system of the lighting-enabled interdental brush is a camera system 25-2.

The camera system 25-2 includes a camera 25-2-1, a data processing and outputting system 25-2-2, the electrical system 26, and the power system 27. The camera 25-2-1 is disposed on the guide head 21 at the front end of the delivery component 2.

Video data output by the data processing and outputting system 25-2-2 of the camera system 25-2 can be displayed on a display 25-2-3 by means of a wired connection or a wireless connection, where the display 25-2-3 may use a smart phone 25-2-31, or a computer 25-2-32, or a liquid crystal display 25-2-33, or a television 25-2-34.

The light source system 24-1 for providing lighting is disposed surround the camera 25-2-1 of the camera system 25.

During operation, by using a lighting function of lighting of the light source system 24-1, after the camera 25-2-1 of the camera system 25-2 is used to perform real-time photography for the operation process, an image and a video that are taken are transmitted to the external display 25-2-3 by using the data processing and outputting system 25-2-2. A user may use the external display 25-2-3 to directly observe a structure of an inner oral cavity and a working state of the interdental brush 1 during a cleaning process.

Figure 18:
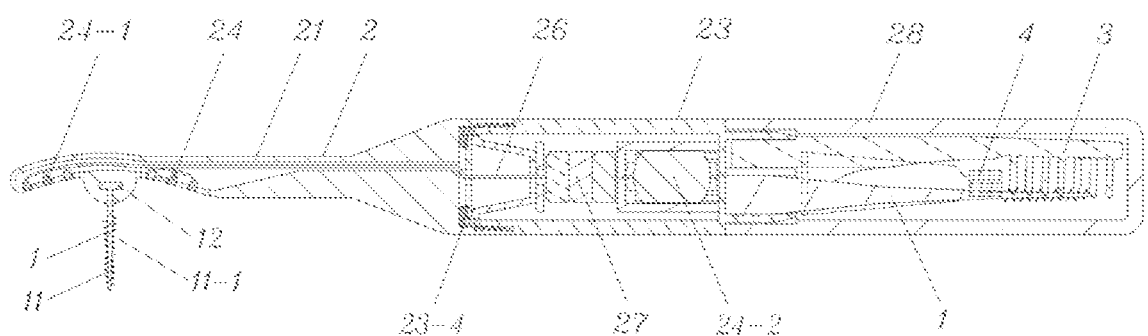
FIG. 18 is a schematic structural diagram of a lighting-enabled interdental brush including a storage compartment of the present application, where in this embodiment, a storage compartment is disposed at a tail of the delivery component, and the storage compartment includes an interdental brush, a toothbrush, and a tooth paste.

Embodiment 17: Visual Interdental Brush Including Storage Space of the Present Invention Referring to FIG. 18, a difference between this embodiment and Embodiment 13 lies in that, a storage compartment 28 is disposed on a tail of the delivery component 2 of the lighting-enabled interdental brush in this embodiment. The storage compartment 28 can at least store one interdental brush 1, one toothbrush 3, and one tooth paste 4. Because the storage compartment 28 is disposed on the tail of the delivery component 2, and the storage compartment 28 can store the interdental brush 1, the toothbrush 3, and the tooth paste 4, it is convenient for users to timely clean their oral cavities after meals when they go out.

During operation, the lighting switch 24-2 is pressed and the light source system 24-1 is connected to the power system 27 by using the electrical system 26 to let the light source system 24-1 emit required lighting. The end of the working part 11 of the interdental brush 1 is aligned to a tooth clearance that needs to be cleaned, and the working part 11 of the interdental brush 1 is pushed into the tooth clearance for cleaning.

It should be noted that the structure disclosed and illustrated in the disclosure may be replaced with a structure having a same effect, and the embodiments described in the present application are not a unique structure for implementing the present application. Although preferred embodiments of the present application are described and illustrated in the present disclosure, a person skilled in the art clearly knows that these embodiments are merely for illustration. A person skilled in the art may make countless changes, improvements, and replacements without departing from the present application. Therefore, the protection scope of the present application is defined by the spirit and scope of the appended claims of the present application.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The invention claimed is:

1. A device, comprising:
    an interdental brush disposed at a front end of the device, the interdental brush including a working part and a connector, wherein:
        the working part is disposed at a front end of the connector and toward the front end of the device;
        the connector is disposed adjacent to the working part and away from the front end of the device;
        the working part includes a protrusion made of a first elastic material; and
        the connector is made of a second elastic material, distinct from the first elastic material;
    a delivery component including a guide head and a sliding mechanism, the sliding mechanism is mechanically connected to the guide head, the guide head configured to house the interdental brush and includes a first open end and a second closed end that are both toward the front end of the device, wherein:
        the guide head includes a bended tube within which the working part of the interdental brush is positioned;
        an outlet of the bended tube is the first open end of the guide head; and
        the sliding mechanism includes a sliding block and an interdental brush connecting mechanism disposed on the sliding block, the interdental brush connecting mechanism comprises a concave-convex-fit groove that mechanically connects the interdental brush to the sliding block via a concave-convex-fit connection mode, wherein a movement of the sliding block along a longitudinal direction of the device causes the working part of the interdental brush to extend out of or withdraw into the outlet of the bended tube at the first open end of the guide head;
    a switch disposed at a rear end of the device, opposite to the front end of the device; and
    a light source disposed (i) at the front end of the device and (ii) on a portion of the guide head, by the second closed end of the guide head, wherein the light source is electrically coupled to the switch through the guide head that houses the interdental brush,
    wherein the interdental brush is configured to be removed from the device by opening a top cover disposed at a front end of the delivery component, detaching the connector of the interdental brush from the concave-convex-fit groove, and removing the interdental brush from the bended tube of the guide head.

2. The device of claim 1, wherein:
    the working part and the connector are formed into single piece by plastic injection molding.

3. The device of claim 1, wherein the working part includes a protrusion, and the protrusion has a structure that is selected from a group consisting of: a thread structure, a vane-type protrusion structure, and a fibrous protrusion structure.

4. The device of claim 1, further comprising:
    a housing, wherein the switch is disposed on the housing.

5. The device of claim 4, wherein:
    the sliding mechanism further comprises a driving spring that can push the sliding mechanism to move forward; and
    the driving spring includes a first end that is connected to the sliding mechanism and a second end that is connected to the housing.

6. The device of claim 4, wherein a storage compartment that can store the interdental brush, or a toothbrush, or a tooth paste is disposed adjacent to the housing, toward the rear end of the device.

7. The device of claim 1, wherein:
    the interdental brush is a linear-type interdental brush that is elastically deformed while installed in the bended tube; and
    after the working part of the linear-type interdental brush extends from the bended tube, the working part of the interdental brush regains a linear shape.

8. The device of claim 1, wherein the interdental brush further comprises a smooth guide head that is disposed at a front end of the working part of the interdental brush.

9. The device of claim 1, wherein:
    the switch and the light source are part of a lighting system; and
    the lighting system further comprises a power system.

10. The device of claim 9, further comprising a housing, wherein:
    the power system is disposed in the housing; and
    the light source, the power system, and the switch are electrically connected together.

11. The device of claim 1, wherein the light source includes an LED light source.

12. The device of claim 1, wherein the delivery component further comprises an observation system.

13. The device of claim 12, wherein the observation system is a camera system.

14. The device of claim 13, wherein the camera system comprises a camera, a data processing and outputting system, an electrical system, and a power system.

15. The device of claim 14, wherein video data output by the data processing and outputting system of the camera system can be displayed on a display by means of a wired connection or a wireless connection, wherein the display comprises: a smart phone, or a computer, or a liquid crystal display, or a television.

16. The device of claim 14, wherein the camera is disposed on the guide head at a front end of the delivery component.

17. The device of claim 14, wherein the camera is installed on the guide head at an adjustable angle.

18. The device of claim 1, wherein the guide head is made of an optical transmission material selected from one or more of: polystyrene, polycarbonate, and polymethylmethacrylate.

19. The device of claim 1, wherein the interdental brush is configured to be taken out from the bended tube of the guide head by removing a cover at a front end of the delivery component.

20. The device of claim 1, wherein a push force applied by the sliding mechanism to the interdental brush is less than 100 grams.

\* \* \* \* \*